(12) United States Patent
Caramanna

(10) Patent No.: US 7,252,431 B1
(45) Date of Patent: Aug. 7, 2007

(54) WATER TEMPERATURE MONITORING APPARATUS

(76) Inventor: A. Gregory Caramanna, 8953 Dudley, Taylor, MI (US) 48180

( * ) Notice: Subject to any disclaimer, the term of this patent is extended or adjusted under 35 U.S.C. 154(b) by 267 days.

(21) Appl. No.: 10/975,904

(22) Filed: Oct. 28, 2004

Related U.S. Application Data

(60) Provisional application No. 60/515,069, filed on Oct. 28, 2003.

(51) Int. Cl.
G01K 1/16 (2006.01)
(52) U.S. Cl. ............... 374/147; 374/163; 374/208; 374/141; 374/143; 116/216
(58) Field of Classification Search ........... 374/141, 374/147
See application file for complete search history.

(56) References Cited

U.S. PATENT DOCUMENTS

| | | | | |
|---|---|---|---|---|
| 2,289,908 A | * | 7/1942 | Gorton | 374/148 |
| 3,187,572 A | * | 6/1965 | Harland | 73/292 |
| 3,895,421 A | * | 7/1975 | Miller | 29/25.42 |
| 3,985,379 A | * | 10/1976 | Normark | 285/340 |
| 4,281,543 A | * | 8/1981 | Raz | 374/147 |
| 4,509,550 A | * | 4/1985 | Monk | 137/551 |
| 4,512,044 A | * | 4/1985 | Clark | 4/581 |
| 4,537,266 A | * | 8/1985 | Greenberg | 177/208 |
| 4,575,262 A | * | 3/1986 | Andersen | 374/147 |
| 4,630,940 A | * | 12/1986 | Ostertag et al. | 374/148 |
| 4,682,626 A | * | 7/1987 | Bergmann | 137/551 |
| 4,773,767 A | * | 9/1988 | Coll | 374/147 |
| 4,991,976 A | * | 2/1991 | Byles | 374/135 |
| 5,160,197 A | * | 11/1992 | Klose | 374/147 |
| 5,172,860 A | * | 12/1992 | Yuch | 239/71 |
| 5,199,790 A | * | 4/1993 | Pawelzik et al. | 374/147 |
| 5,265,959 A | * | 11/1993 | Meltzer | 374/147 |
| 5,320,137 A | | 6/1994 | Huang | 137/551 |
| 5,375,271 A | * | 12/1994 | Frankel | 4/581 |
| 5,415,203 A | * | 5/1995 | Huang | 138/104 |
| 5,535,779 A | * | 7/1996 | Huang | 137/559 |
| 5,575,034 A | * | 11/1996 | Biernacinski et al. | 15/217 |
| D385,204 S | * | 10/1997 | Steinhagen et al. | D10/57 |
| 5,781,941 A | * | 7/1998 | Radke et al. | 4/583 |
| 6,003,166 A | * | 12/1999 | Hald et al. | 4/541.1 |
| 6,427,260 B1 | * | 8/2002 | Osborne-Kirby | 4/678 |
| 6,641,305 B2 | * | 11/2003 | Wang | 374/148 |
| 6,895,985 B2 | * | 5/2005 | Popper et al. | 137/2 |
| 2003/0192871 A1 | * | 10/2003 | Glucksman | 219/432 |
| 2005/0178590 A1 | * | 8/2005 | Martin-Woodin et al. | 177/144 |
| 2006/0045167 A1 | * | 3/2006 | Pawlenko et al. | 374/148 |
| 2006/0064814 A1 | * | 3/2006 | Bushman et al. | 4/583 |

FOREIGN PATENT DOCUMENTS

GB 2310283 A * 8/1997
GB 2355305 A * 4/2001

* cited by examiner

Primary Examiner—Gail Verbitsky

(57) ABSTRACT

An apparatus generally including a housing, a power source, a temperature sensor, a display and a circuit. The housing may have a bore adaptable to receive a flow of water. The power source may be operational for generating electricity and coupled to the housing. The temperature sensor may be coupled to the housing and in thermal contact with the water flowing through the bore. The visual display may be coupled to the housing and configured to display a temperature of the water. The circuit may be powered by the electricity and configured to control the display in response to reading the temperature sensor.

22 Claims, 31 Drawing Sheets

US 7,252,431 B1

WATER TEMPERATURE MONITORING APPARATUS

This application claims the benefit of U.S. Provisional Application No. 60/515,069, filed Oct. 28, 2003 which is hereby incorporated by reference in its entirety.

FIELD OF THE INVENTION

The present invention relates to temperature sensing generally and, more particularly, to a water temperature monitoring apparatus.

BACKGROUND OF THE INVENTION

Conventional water heating systems used in houses and buildings provide hot water to people at a variety of temperatures. Water temperatures ranging from 120 to 140 degrees Fahrenheit are common but can be irritating or even painful if a person remains in contact with the hot water for too long. Water temperatures up to 160 degrees Fahrenheit and higher can scald on contact.

A common method used by people to check the water temperature is to place a hand or finger into the flowing water. Such a check may be harmful if the water is very hot. Another common method is to start a faucet flowing with only cold water then increase an amount of hot water with one hand while testing the water temperature with the other hand. The process is usually time consuming and still presents a possible danger of scalding if the hot water flow is increased too fast.

SUMMARY OF THE INVENTION

The present invention concerns an apparatus generally comprising a housing, a power source, a temperature sensor, a display and a circuit. The housing may have a bore adaptable to receive a flow of water. The power source may be operational for generating electricity and coupled to the housing. The temperature sensor may be coupled to the housing and in thermal contact with the water flowing through the bore. The visual display may be coupled to the housing and configured to display a temperature of the water. The circuit may be powered by the electricity and configured to control the display in response to reading the temperature sensor.

The objects, features and advantages of the present invention include providing a water temperature measuring apparatus that may (i) be installed at the end of existing faucets, (ii) be installed inline with a shower head, (iii) be installed at a drain, (iv) provide a user adjustable or predetermined alarm temperature, (v) generate a visual alarm for water temperatures above the alarm temperature, (vi) generate an audio alarm for water temperatures above the alarm temperature, (vii) generate electrical power from the flowing water, (viii) generate electrical power from ambient room light and/or (ix) operate without electrical power.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
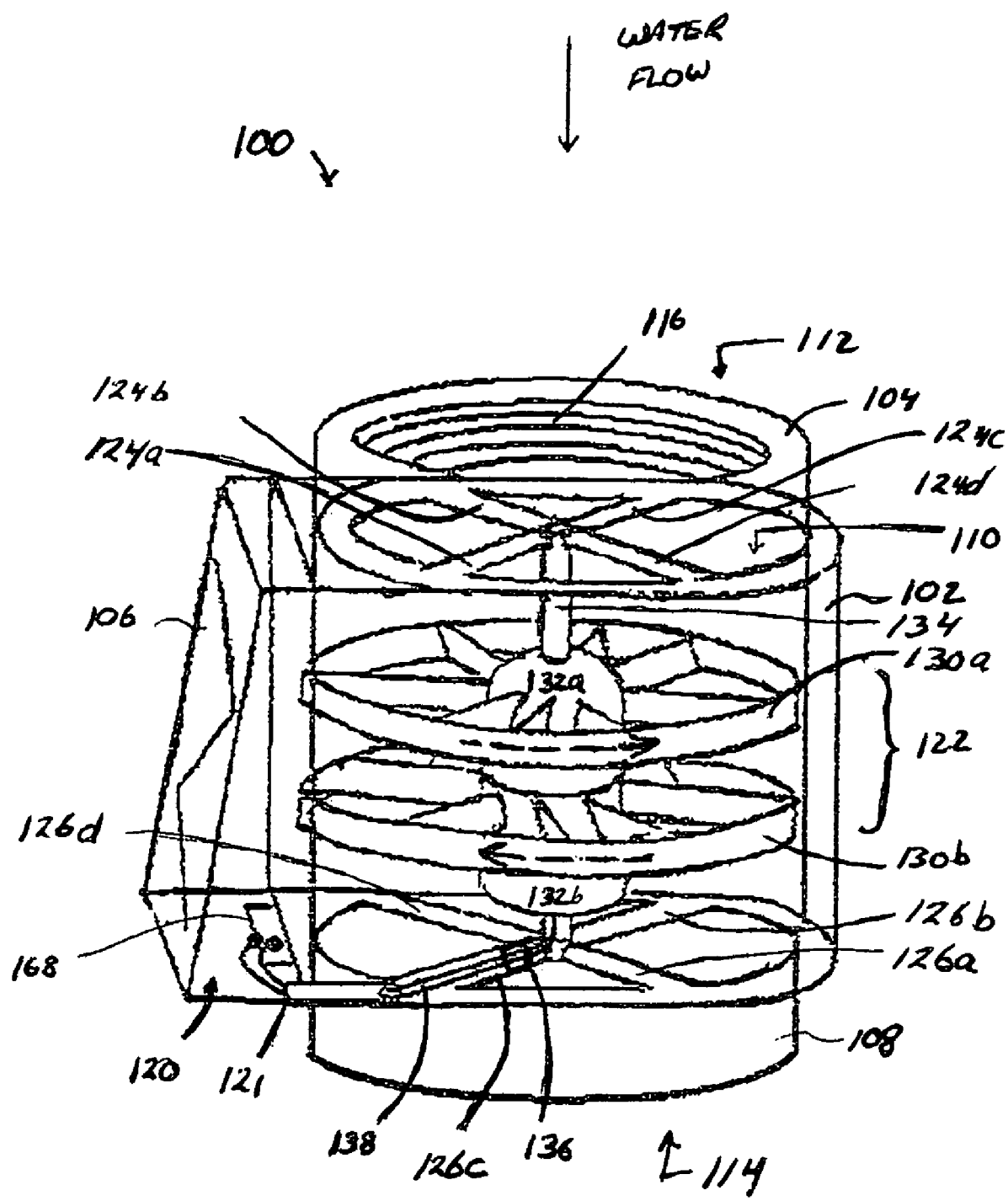
FIG. 1 is a cut away view of an electrical apparatus in accordance with a preferred embodiment of the present invention.

Referring to FIG. 1, a cut away view of an apparatus 100 is shown in accordance with a preferred embodiment of the present invention. The apparatus 100 is generally designed to monitor, measure and indicate a temperature of water flowing from a conventional faucet or similar fixture. The apparatus 100 may indicate the water temperature using a visual and/or audio mechanism. Visual water temperature indications may be accurate to within less than a degree (e.g., ±0.1 degrees) Fahrenheit. One or more adapters may be provided on the apparatus to permit easy adaptation to any variation of water outlet fixtures whatever the make, model and/or style. In one embodiment, the apparatus 100 may be directly integrated into a water fixture.

An outer mechanical portion of the apparatus 100 generally comprises a housing 102, a top fitting (or adapter) 104, a face panel 106 and an optional bottom fitting 108. The housing 102 may have a bore 110 extending from a top to a bottom. A bore 112 in the top fitting 104 may be coaxially aligned with the bores 110 and 114 of the housing 102 and the bottom fitting 108. The top fitting 104 may be directly connected to the top of the housing 102. The bores 110, 112 and 114 may be aligned to permit water from a fixture (not shown) to flow through the apparatus 100.

The housing 102 is generally fabricated from a hard material such as metal, ceramic or plastic.

The top fitting 104 is generally fabricated from a metal, plastic, rubber material or other polymer for flexible adaptation in various attachments. Where the fitting 104 is formed from a relatively hard material, such as metal or plastic, threads 116 may be formed inside the bore 112 and/or on an outer surface of the fitting 104 at an outer end opposite the housing 102. Where the fitting 104 is formed from a pliable or resilient material, an inner diameter of the bore 112 at an outer end opposite the housing 112 may be designed slightly smaller than an outer diameter of the fixtures with which the apparatus 100 may be coupled. In one embodiment, the fitting 104 may be integrally formed as part of the housing 102. In another embodiment, the fitting 104 may be created separately from the housing 102 and then mounted to the housing using an adhesive, compression fitting, clamp or the like.

The bottom fitting 108 may be formed separately or integral to the housing 102. The bottom fitting 108 may form a spout fixture for other potential attachments like a normal faucet (e.g., water softener appliances, water purifies, dish washers and the like). Dimensions of the bottom fitting 108 may be compatible with normal faucet sizes.

The face panel 106 may be fabricated of a hard material, such as metal or plastic. In one embodiment, the face panel 106 is generally made from or coated with an electrically insulating material. The face panel 106 may be mounted to the housing 102 along a side of the housing 102 below the top fitting 104. A chamber 120 may be formed between the face panel 106 and the housing 102. A channel (or opening) 121 may be formed in the housing 102 such that the bore 110 may be in communication with the chamber 120.

An electricity power source (or electricity generating mechanism) 122 may be coaxially mounted inside the bore 110. Top brackets 124a–d and bottom brackets 126a–d may be formed across the bore 110 to support the power source 122. The power source 122 generally comprises one or more sets of blades 130a–b that drive one or more micro-generators 132a–b.

Each set of blades 130a–b may be implemented as turbine blades, impeller blades or the like. The blade sets 130a–b are generally manufactured using a metal alloy, ceramic, stamped injected plastic or other water resistant material. In one embodiment, a first set of blades (e.g., blades 130a) may rotate in a counter clockwise direction and a second set of blades (e.g., blades 130b) may rotate in a clockwise direction as viewed from the top of the housing 102. In another embodiment, all of the blades 130a–b may rotate in the same direction, either clockwise or counter clockwise. Other numbers of blade sets 130 and/or other rotational directions may be implemented to meet a criteria of a particular application.

Each micro-generator 132a–b may be directly connected to an axial shaft 134 and one set of blades 130a–b, respectively. The axial shaft 134 is generally coaxially mounted in the bore 110 and supported at each end by the brackets 124a–d and 126a–d. Each micro-generator 132a–b may generate electrical power. The micro-generators 132a–b may generate alternating current (AC) or direct current (DC) electrical power. AC power may be rectified within the micro-generators or within the chamber 120.

A temperature sensor 136 may be mounted inside the bore 110 to measure the temperature of the water flowing through the apparatus 100. In one embodiment, the temperature sensor 136 may be part of or mounted to one of the top brackets 124a–d. In another embodiment, the temperature sensor 136 may be part of or mounted to one of the bottom brackets 126a–d.

A harness 138 having multiple wires may route the electrical power and temperature information from inside the bore 110 through the channel 121 to the chamber 120. The harness 138 may carry the power from the micro-generators 132a–b. The harness 138 may also provide biasing to, and convey a temperature signal from the temperature sensor 136.

Figure 2:
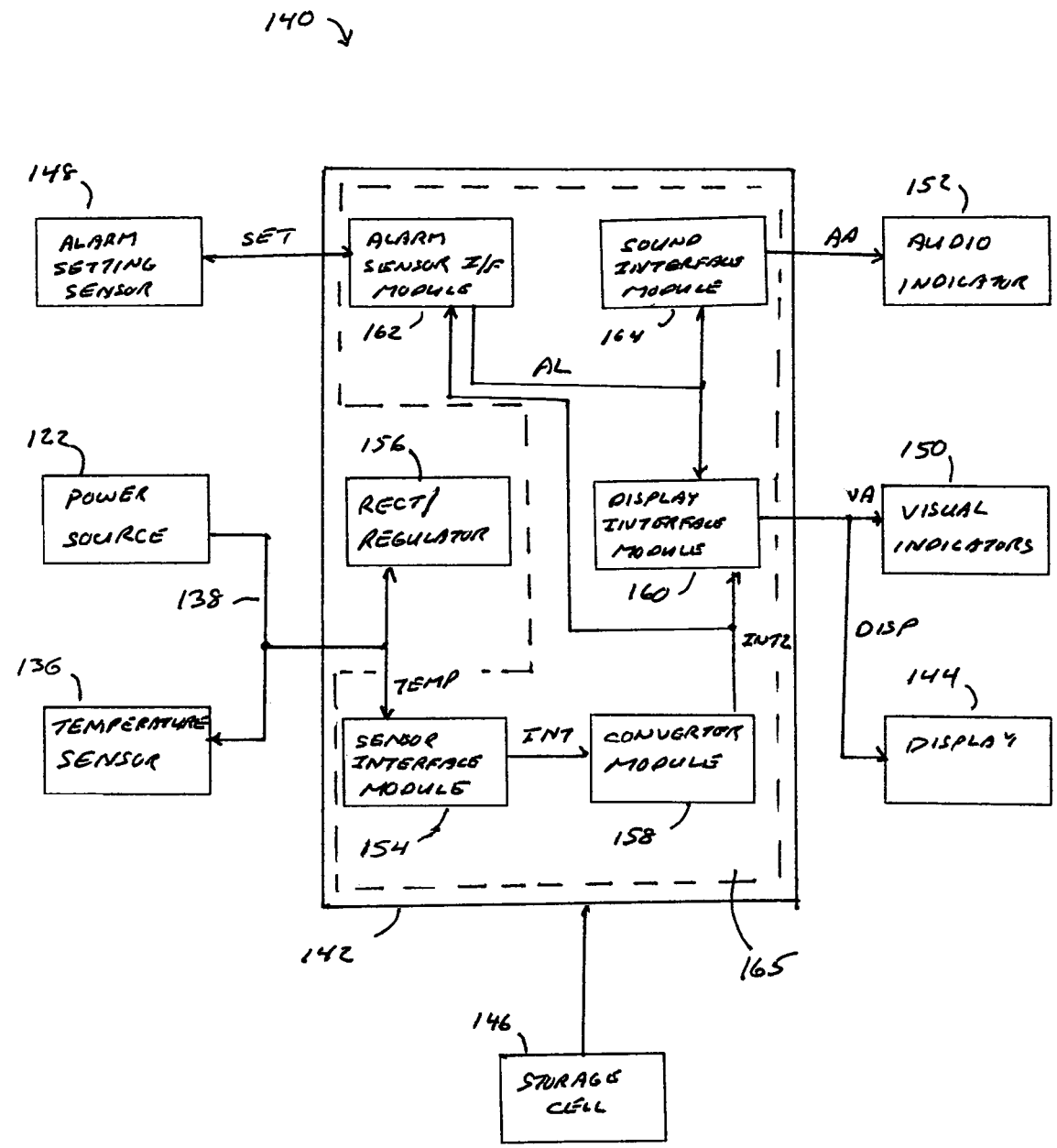
FIG. 2 is a block diagram of an example implementation of an electronic circuit for the electrical apparatus.

Referring to FIG. 2, a block diagram of an example implementation of an electronic circuit 140 for the apparatus 100 is shown. The electronic circuit 140 generally comprises the power source 122, the temperature sensor 136, the harness 138, an integrated chip (or circuit) 142, a display 144, an optional storage cell 146, an optional alarm setting sensor 148, one or more optional visual indicators 150 and an optional audio indicator 152. The circuit 142 and storage cell 146 are generally mounted inside the chamber 120. The visual display 144, alarm setting sensor 148, visual indicators 150 and audio indicators 152 are generally mounted through the face panel 106 for accessibility by a user.

The circuit 142 generally comprises a sensor interface module 154, a power interface module 156, a converter module 158, a display interface module 160, an alarm sensor interface module 162, and a sound interface module 164. Each module 154–164 of the circuit 142 may be fabricated as separate modules or as a single integrated circuit. In one embodiment, the power interface module 156 may be formed as a first module and the remaining modules 154 and 158–164 may be formed as a second module 165.

The power interface module 156 may be implemented as a rectifier and/or regulator module. The rectifier/regulator module 156 may receive the power from the micro-generators 132*a–b*. Power to and from the storage cell 146 may also be controlled by the rectifier/regulator module 156. The rectifier/regulator module 156 may provide power distribution and control for the rest of the circuit 142.

The storage cell 146 may be implemented as a battery or a capacitor. The storage cell 146 is generally operational to store electrical power while the power source 122 is active and deliver power back to the other modules while the power source 122 is inactive or generating a reduced amount of power. In one embodiment, the storage cell 146 may be the power source 122. A battery implementation of the storage cell 146 may include, but is not limited to lithium-ion, nickle-cadmium, metal-hydride and other types of rechargeable batteries. The battery 146 may be accessible through a door 168 provided in the housing 102 or face panel 106.

The temperature sensor interface module 154 may be configured to provide a biasing voltage or current to the temperature sensor 138. A temperature signal (e.g., TEMP) generated by the temperature sensor 138 may be received by the temperature sensor interface module 154. The temperature sensor interface module 154 may generate an internal signal (e.g., INT) by conditioning the signal TEMP. The internal signal INT may be provided to the converter module 158.

The converter module 158 may generate a second internal signal (e.g., INT2) by converting the internal signal INT. In one embodiment, the conversion performed by the converter module 158 may be an analog to digital conversion. In another embodiment, the converter module 158 may amplify and/or offset the signal INT to generate the signal INT2. The signal INT2 may be provided to the display interface module 160 and the alarm sensor interface module 162.

The display interface module 160 may be operational to generate one or more display signals (e.g., DISP) to drive the display 144 based upon the signal INT2. The display interface module 160 may also be operational to generate one or more visual alarm signals (e.g., VA) to drive the visual alarm indicators 150 in response to an alarm signal (e.g., AL) generated by the alarm sensor interface module 162. In one embodiment, the display interface module 160 may generate three or four seven-segment digital display signals DISP to control three or four seven-segment numeric characters of the display 144. A three-number display 144 may provided for a decimal readout of the water temperature in a range from 0 to 999 degrees Fahrenheit or Celsius. A four-number display 144 may provide a decimal readout in a range from 0.0 to 999.9 degrees Fahrenheit or Celsius. In another embodiment, multiple display signals DISP may be generated, each individual display signal DISP controlling a single element of a bar-type graphic of the display 144 (see FIG. 3). The bar-type display 144 may increment a temperature bar in units of 0.5, 1, 2, 5 or other appropriate steps in degrees Fahrenheit or Celsius.

The display 144 may be implemented as a liquid crystal display, a light emitting diode display or an analog display. The display 144 may be configured to operate from a low voltage source such as a watch battery (e.g., storage cell 146) and/or the power source 122. Other display technologies, including future developments, may be implemented to meet the criteria of a particular application.

The visual alarm indicator 150 may be implemented as a light emitting diode or a symbol on a liquid crystal display. Other indicator technologies, including future developments, may be implemented to meet the criteria of a particular application.

The alarm sensor interface module 162 may be configured to provide a bias power (voltage or current) to the alarm setting sensor 148. One or more signals (e.g., SET) may be generated by the alarm setting sensor 148 and provided to the alarm sensor interface module 162. The alarm sensor interface module 162 may generate the alarm signal AL by comparing the signal SET and the temperature signal INT2 (or the signal INT). The alarm signal AL may have a true state while the temperature signal INT2 is greater than or equal to the signal SET. The alarm signal AL may have a false state while the temperature signal INT2 is less than the signal SET. The alarm signal AL may be provided to the display interface module 160 and the sound interface module 164.

In one embodiment, the alarm setting sensor 148 may be implemented as a potentiometer. The alarm setting sensor 148 may receive a user input to generate the signal SET. In another embodiment, the alarm setting sensor 148 may have a factory-determined value that the user may not adjust. Other types of sensor, such as multi-position switches, may be implemented to meet the criteria of a particular application.

The sound interface module 164 may be operational to drive the audio indicator 152. The sound interface module 164 may generate an audio alarm signal (e.g., AA) based upon the alarm signal AL. While the signal AL is in the true state, the sound interface module 164 may generate the alarm signal AA to create a spoken voice message, a tone, a sequence of beeps or the like, including a wide array of varying sounds and/or combinations of audible signals.

The audio indicator 152 may be implemented as a speaker. The audio indicator 152 is generally configured to convert the audio alarm signal AA into sounds audible to a user. The audio indicator 152 is generally made of a water resistant material, such as a piezoelectric transducer or a water-proof diaphragm speaker. The audio indicator 152 may be similar to the indicators found in smoke detectors and other non-diaphragm sound indicators, such as cell phone type speakers. Other technologies, including future developments, may be used to implement the audio indicator to meet the criteria of a particular application.

In operation, water flowing through the bore 110 rotates the blade sets 130*a–b* thereby applying torque to the micro-generators 132*a–b*. The electrical power created by the micro-generators 132*a–b* is provided to the circuit 142 that wakes up and initializes. After initialization, the circuit 142 may deliver power to the temperature sensor 138 the alarm setting sensor 148 and the display 144. Once the temperature sensor 138 generates the temperature signal TEMP, the circuit 142 receives, buffers, converts and drives a value for the temperature of the water to the display 144. If the temperature of the water exceeds a particular user value applied to the alarm setting sensor 148, the circuit 142 may activate the visual warning indicators 150 and/or the audio warning indicator 152. When the water temperature cools below the particular alarm setting, the circuit 142 may deactivate the visual alarm indicators 150 and the audio alarm indicator 152.

Figure 3:
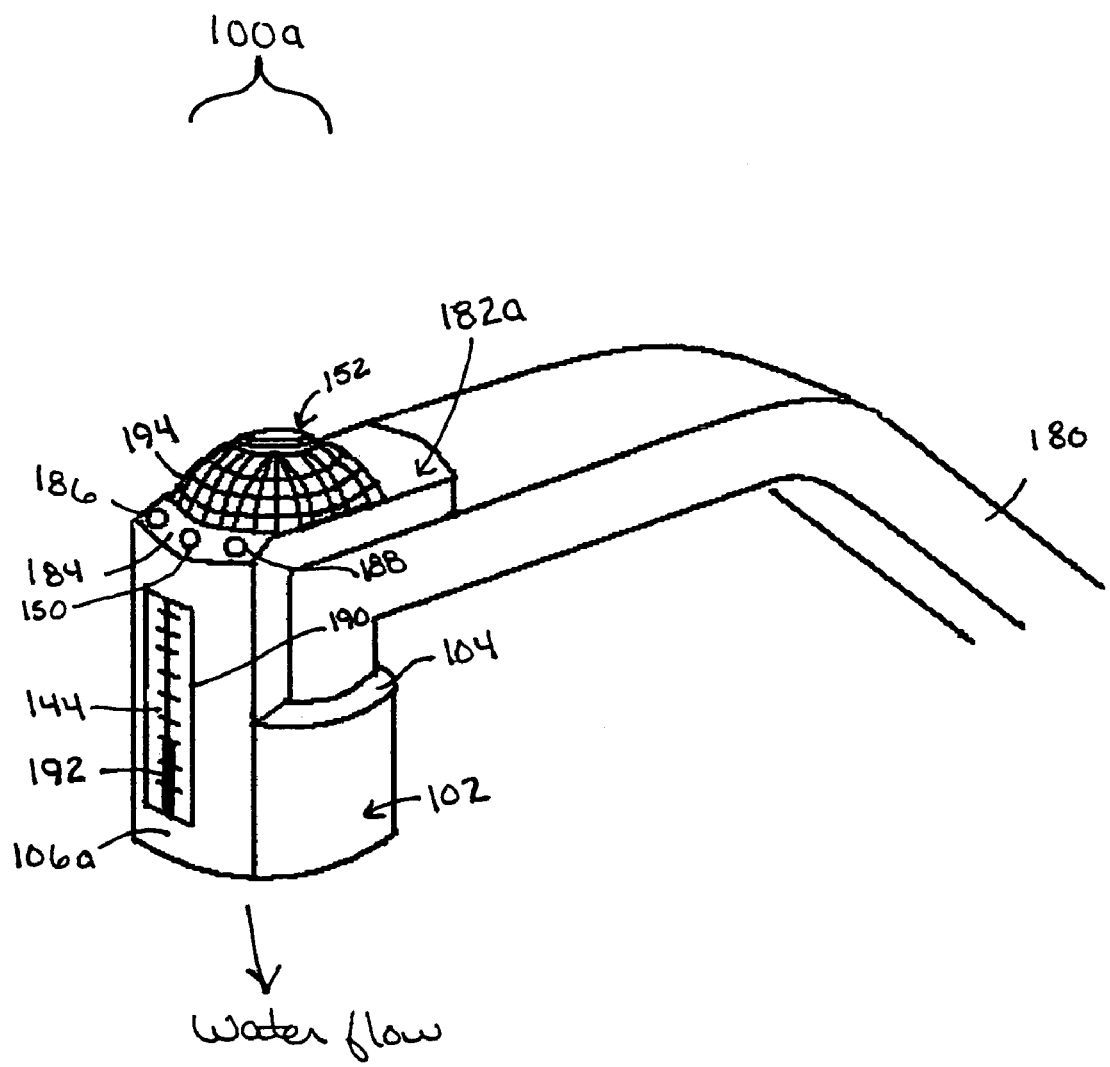
FIG. 3 is a perspective view of a second example implementation of the electrical apparatus.

Referring to FIG. 3, a perspective view of a second example implementation of an apparatus 100*a* attached to a faucet 180 is shown. Elements of the apparatus 100*a* similar to elements of the apparatus 100 may be shown with the same reference numbers. The electronic circuit 140 may be incorporated into the apparatus 100*a*. A face panel 106*a* of the apparatus 100a may extended above the top of the housing 102. A horizontal portion 182a of the face panel 106a may be shaped to extend across and lay flat on a top side of the faucet 180. A beveled edge 184 may be formed in the face panel 106a along an edge facing the user.

The visual indicator 150 may be implemented as a lamp or light emitting diode (LED) mounted in the beveled edge 184. The alarm setting sensor 148 may be implemented as two switches 186 (e.g., DOWN) and 188 (e.g., UP). The switches 186 and 188 may be pressed by the user, one at a time, to adjust the alarm setting to a particular temperature. An alarm setting indicator 190 may be provided on the display 144 to indicate the alarm temperature entered by the user.

The display 144 may be mounted along the vertical edge of the face panel 106a for a side looking view. The display 144 may implement a bar 192 to indicate the actual water temperature. The bar 192 may be incremented in units of 0.5, 1, 2, 5 or other appropriate step sizes in degrees Fahrenheit or Celsius. The bar 192 may range in temperature from 40 to 165 degrees Fahrenheit. A protective cover 194 may be provided over the speaker 152 to protect from accidental contact and minimize exposure to splashed water.

Figure 4:
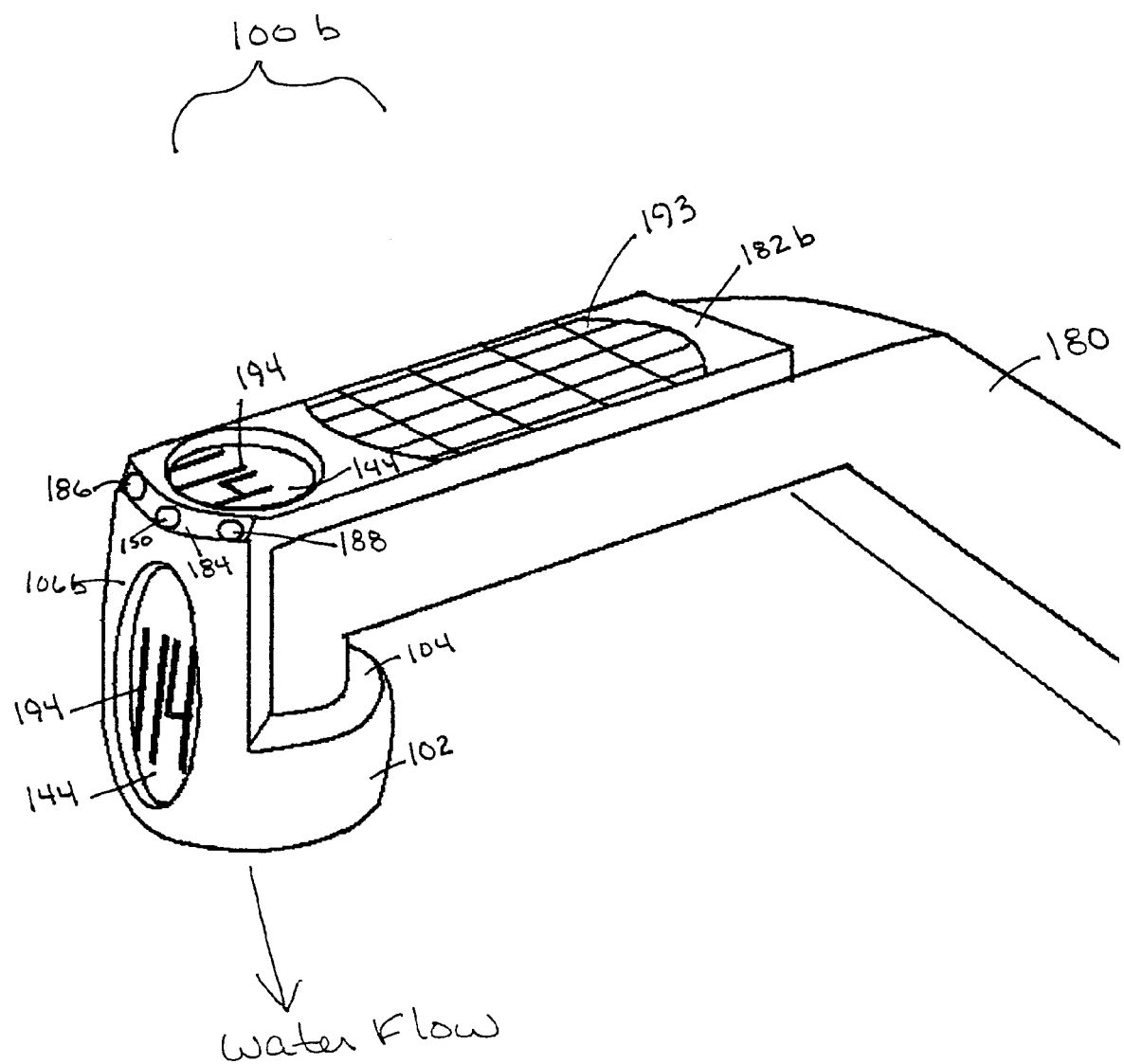
FIG. 4 is a perspective view of a third example implementation of the electrical apparatus.

Referring to FIG. 4, a perspective view of a third example implementation of an apparatus 100b is shown. Elements of the apparatus 100b similar to elements of the apparatus 100 and 100a may be shown with the same reference numbers. Part of the electronic circuit 140 (e.g., all elements except the sound interface module 164 and the audio indicator 152) may be incorporated into the apparatus 100b. A face panel 106b of the apparatus 100b may extended above the top of the housing 102. A horizontal portion 182b of the face panel 106b may be shaped to extend across a top side of the faucet 180. A beveled edge 184 may be formed in the face panel 106b along an edge facing the user.

The power source 122 may be implemented as a solar cell 193. The solar cell 193 may be disposed in the horizontal portion 182b to maximize light gathering from overhead lights and/or natural sunlight streaming through a nearby window. The solar cell may be capable of generating electrical power under normal interior lighting conditions. An example solar cell may be illustrated by the solar cells of a conventional hand-held calculator. In one embodiment, the apparatus 100b may include both the solar cell 193 and one or more micro-generators 132a–b with blades 130a–b to power the rest of the electronic circuit 140. The solar cell 193 may be supplemented with one or more micro-generators 132 (not shown) and/or a battery (not shown).

One or more displays 144 may each be implemented with seven-segment digital characters 194. The characters 194 may normally provide an indication of the actual temperature of any water flowing through the housing. While either or both of the switches 186 and 188 are activated by the user, the characters 194 may indicate the alarm temperature. Mounting one of the displays 144 in the horizontal portion 182b may provide the apparatus 100b with a top viewing capability from a user point of view. Mounting another of the displays 144 in the face panel 106b may provide the apparatus 100b with a side viewing capability from the user point of view.

Figure 5:
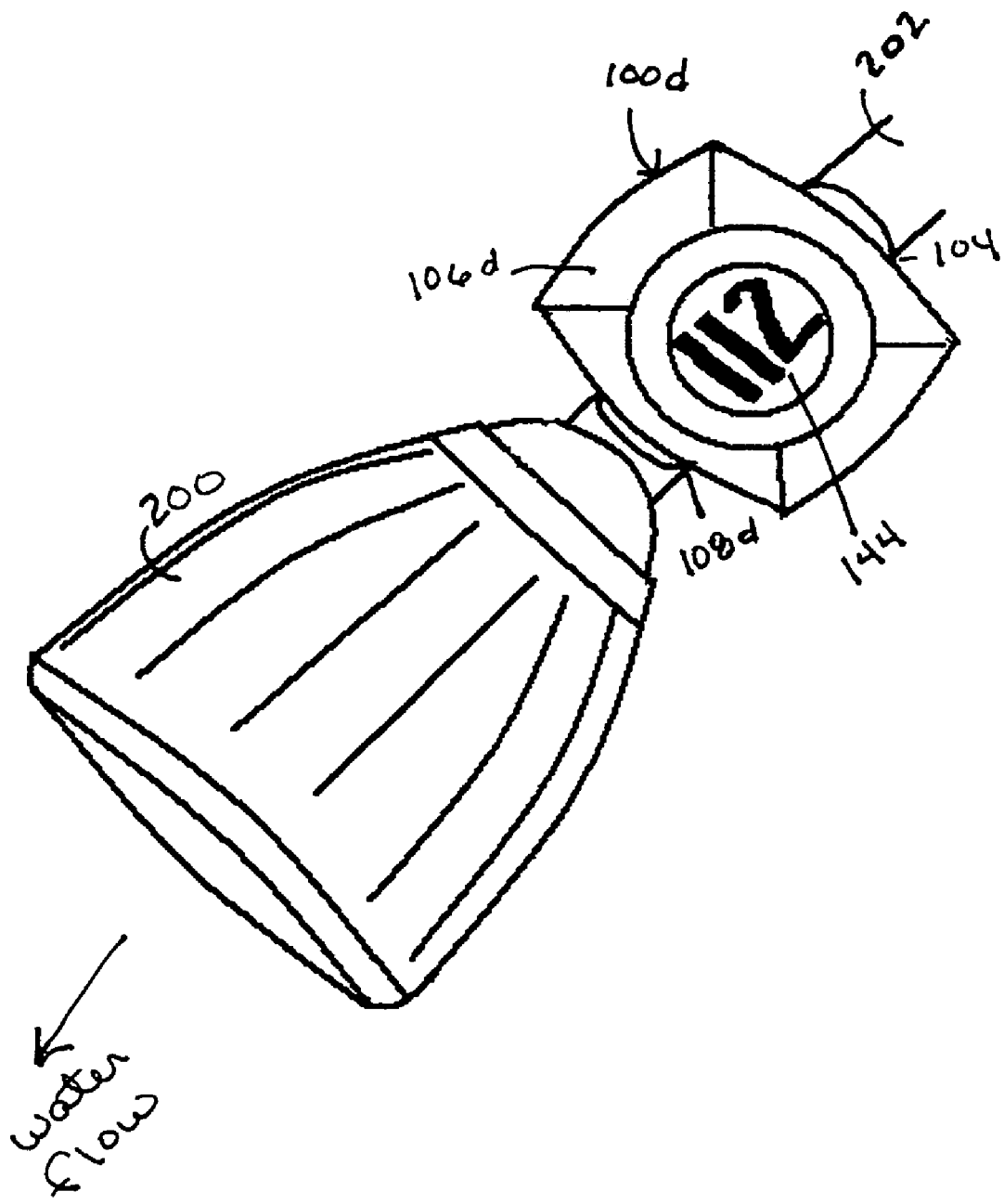
FIG. 5 is a side view of a fourth example implementation of the electrical apparatus.

Referring to FIG. 5, a side view of a fourth example implementation of an apparatus 100d is shown. The apparatus 100d may be arranged to by readily adapted to many conventional types of shower heads. The bottom fitting 108d of the apparatus 100d may be formed with outside threads (not shown) to accommodate attachment to (e.g., screw on) the shower head 200. The top fitting 104 may include the inside threads 116 (not visible) to attach to (e.g., screw on) a wall pipe 202. The face panel 106d and the display 144 may be adapted to swivel around for easy viewing access. The display 144 may also swivel independently of the face panel 106b to permit customization of the viewing angle. Portions of the electronic circuit 140 (e.g., excluding the elements related only to the alarm operation) may be included in the apparatus 100d.

Figure 6:
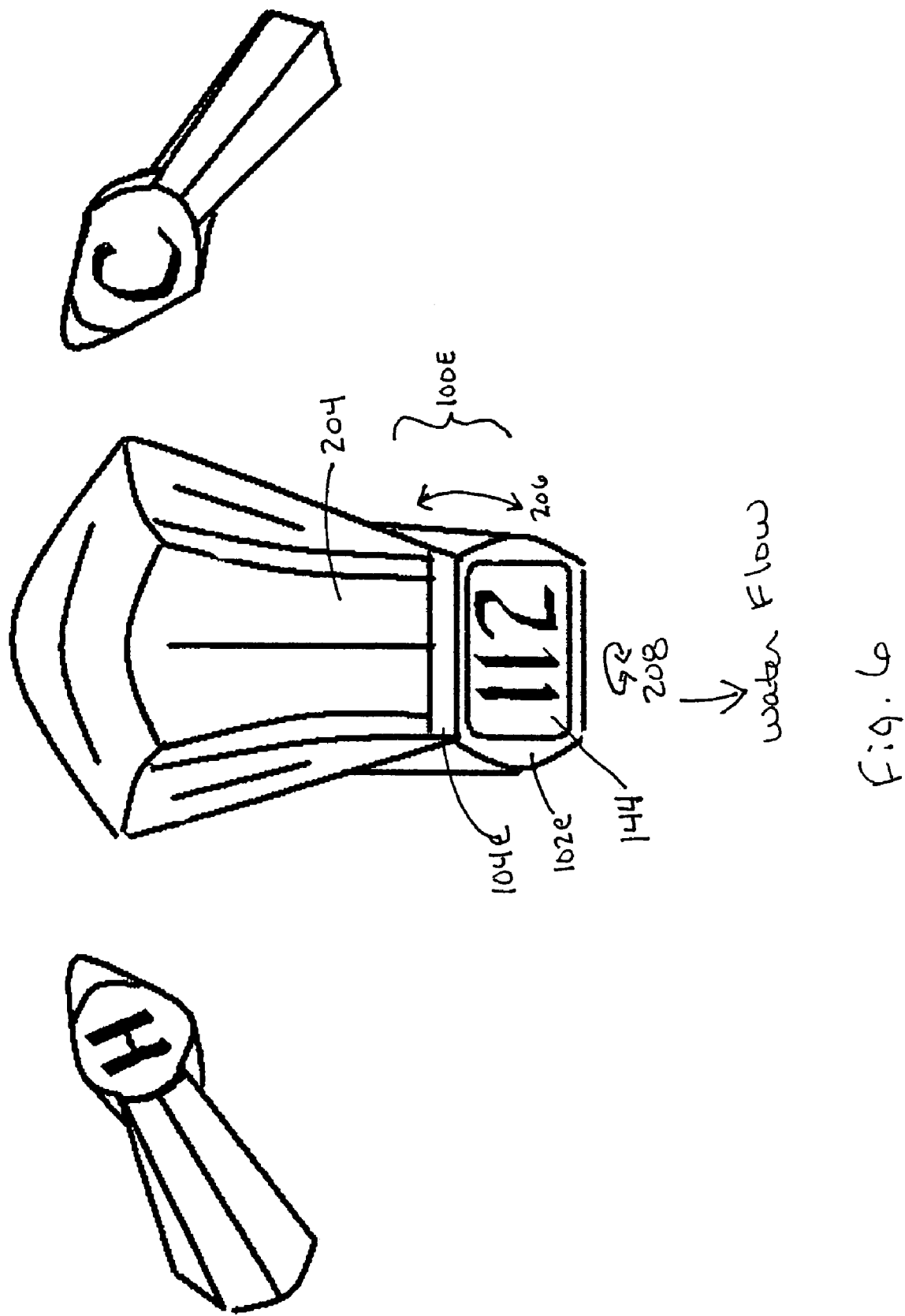
FIG. 6 is a front view of a fifth example implementation of the electrical apparatus.

Referring to FIG. 6, a front view of a fifth example implementation of an apparatus 100e is shown. The apparatus 100e may be designed for coupling to a bath faucet 204. A top fitting 104e may be formed of a flexible water tight rubber bushing to provide easy adaptation to various sizes and shapes of the spout area of the bath faucet 204. Other types of attaching devices may be implemented. For example, a "C" clamp or a screw-on accessory adapter may be provided as the top fitting 104e to adapt to the bath faucet 204. An interface between the top fitting 104e and the housing 102e may form a ball joint allowing for swiveling of the display 144 to a variety of angles. Swiveling of the display 144 up and down 206 and/or left to right 208 generally allows the water temperature to be viewed from various angles in the vicinity of the bath area. Portions of the electronic circuit 140 (e.g., excluding the elements related only to the alarm operation) may be included in the apparatus 100e.

Figure 7:
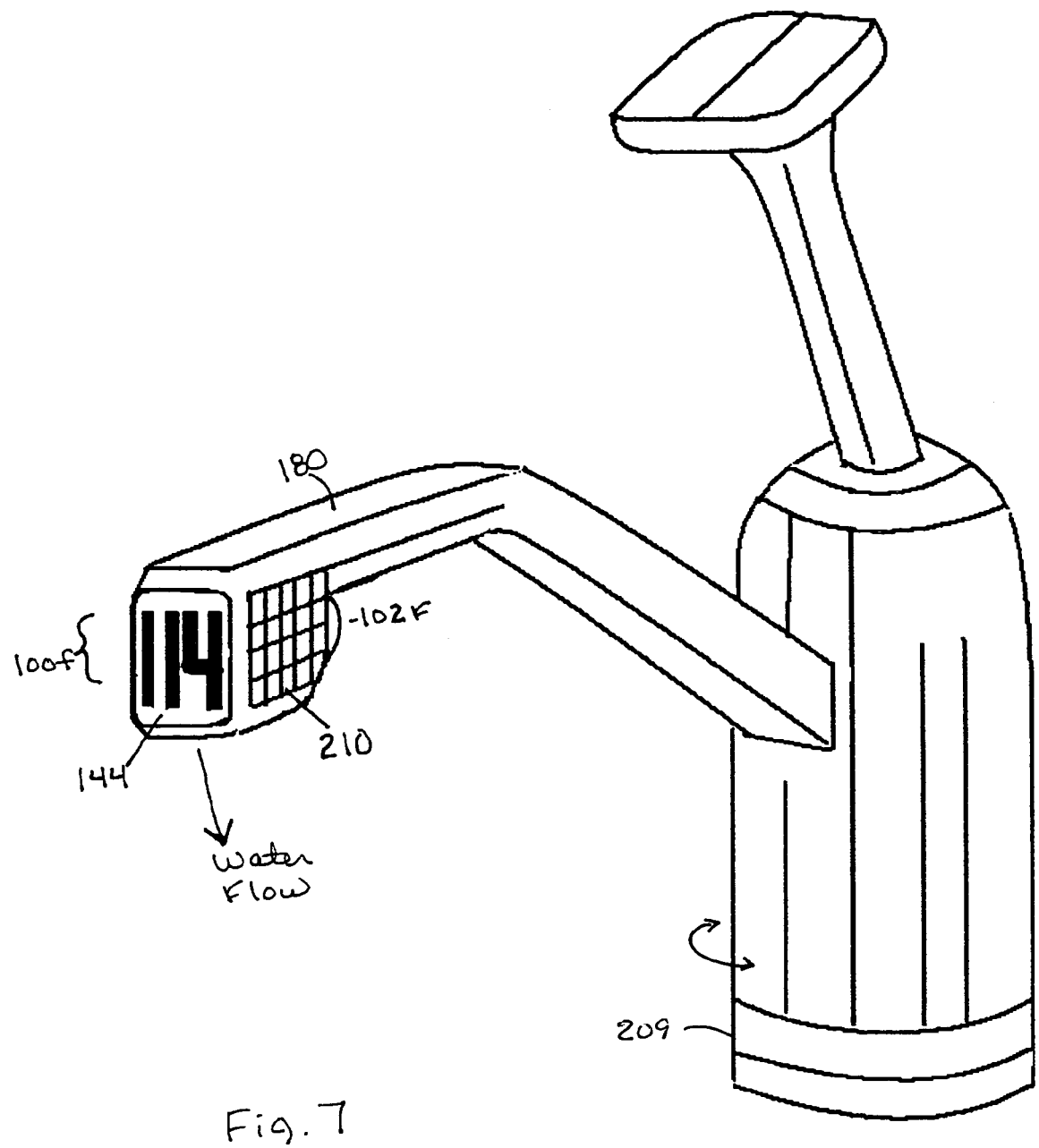
FIG. 7 is a perspective view of a sixth example implementation of the electrical apparatus.

Referring to FIG. 7, a perspective view of a sixth example implementation of an apparatus 100f is shown. An outer portion of the apparatus 100f generally comprises the housing 102f, the display 144 and a side mounted solar cell 210. The rest of the electronic circuit 140 may be mounted inside the chamber 120 (not visible). Operation of the electronic circuit 140 may be include some functionality of conventional digital thermometers for temperature measurement and display. The apparatus 100f may include an internal storage cell 146 implemented as a battery (not visible). The battery storage cell 146 is generally charged by the solar cell 210 while light is available. The battery storage cell 146 may provide electrical power to the rest of the electronic circuit 140 during low light or no light conditions. An interface between the top fitting 104 (not visible) and the housing 102f may form a ball joint to permit the housing 102f to swivel with respect to the faucet 180.

The lighting may vary throughout the day, from home to home, as the surrounding conditions change and as the faucet 180 is used. For example, the faucet 180 may include a swivel joint 209 allowing for rotation about an azimuth axis. Therefore, the solar cell 210 may be extended to the top and far side of the faucet 180 to accommodate whatever light angle may be available.

Figure 8:
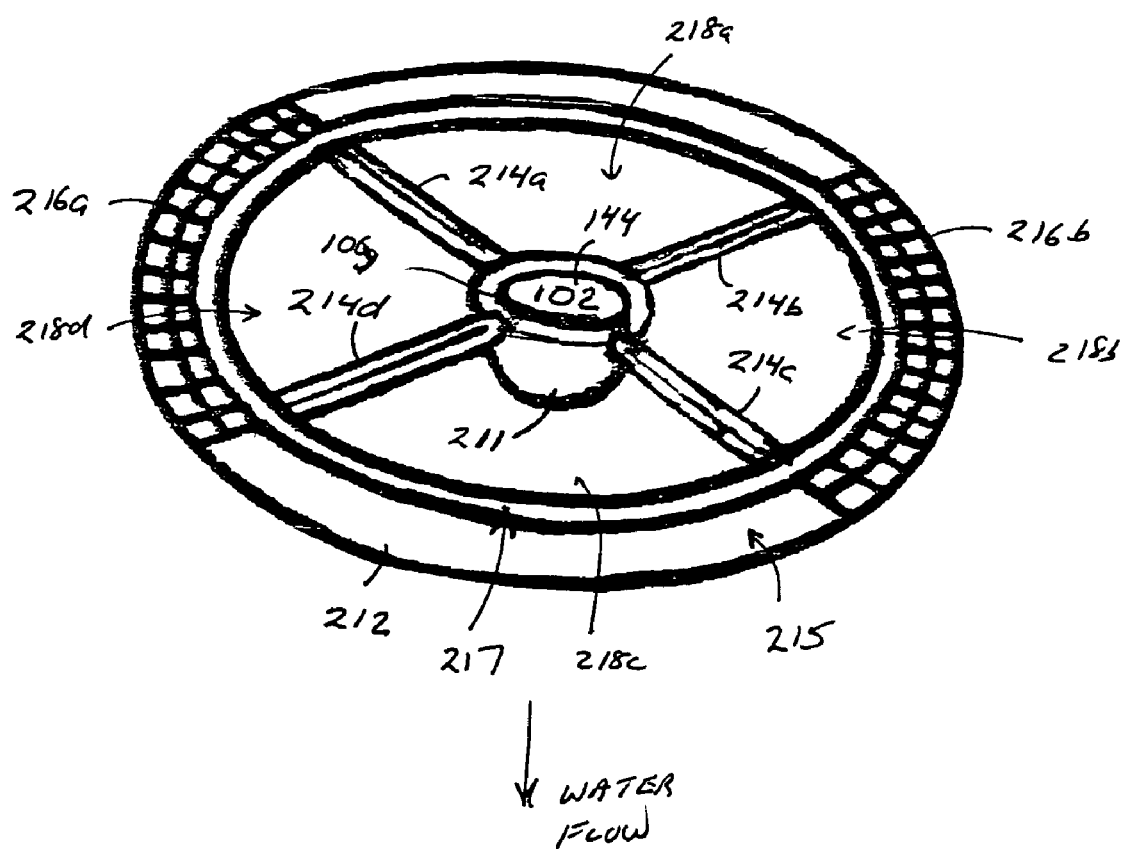
FIG. 8 is a perspective view of a seventh example implementation of the electrical apparatus.

Referring to FIG. 8, a perspective view of a seventh example implementation of an apparatus 100g is shown. In some situations, such as a sink where individual hot and cold faucets are available, measurement of the water temperature may be performed at a drain of the sink, a tub or a shower. A mechanical structure of the apparatus 100g generally comprises a housing 211, an annular ring 212 and multiple cross braces (or arms) 214a–d connecting the housing 211 to the annular ring 212. The power source 122 may be implemented as one or more solar cells 216a–b disposed along an upward-facing surface the annular ring 212. In use, the housing 211 may be centered in the drain. The annular ring 212 may have an inner diameter greater than the drain to prevent the apparatus 100g from falling into the drain. Gaps 218a–d between the housing 211 and the annular ring 212 generally provide a path for the water to flow through the assembly 100g and into the drain. The temperature sensor 136 (not visible) may be disposed in one of the cross braces 214a–d, along a top surface 215 of the annular ring 212 and/or proximate an inner surface 217 of the annular ring 212. The temperature sensor 136 may be fabricated over a large area along the top surface 215 and/or proximate the inner surface 217 to provide a quick sensing of water temperature changes. The remaining elements of the electronic circuit 140 may be disposed inside the housing 211.

The housing 211 may be made from a highly break resistant and water proof material. The annular ring 212 is generally made of a ridged material, such as metal, ceramic or hard plastic, to provide mechanical support for the solar cells 216a–b. The arms 214a–d may be formed from a mildly resilient material to allow some flexibility in the event that a considerable amount of weight or pressure is applied directly to the display 144 or the face panel 106g. The housing 211 may include a reinforced break-resistant plastic for protection. The arms 214a–d may also have a high thermally conductive material to transfer the water temperature to the temperature sensor 136. The face panel 106g may be detachably coupled to the housing 211 if a battery 146 is included inside the housing 211. A removable watertight seal may be provided between the face panel 106g and the housing 211 to allow for access to the battery 146. In one embodiment, the face panel 106g may be permanently connected to the housing 211, for example, using an adhesive.

Figure 9:
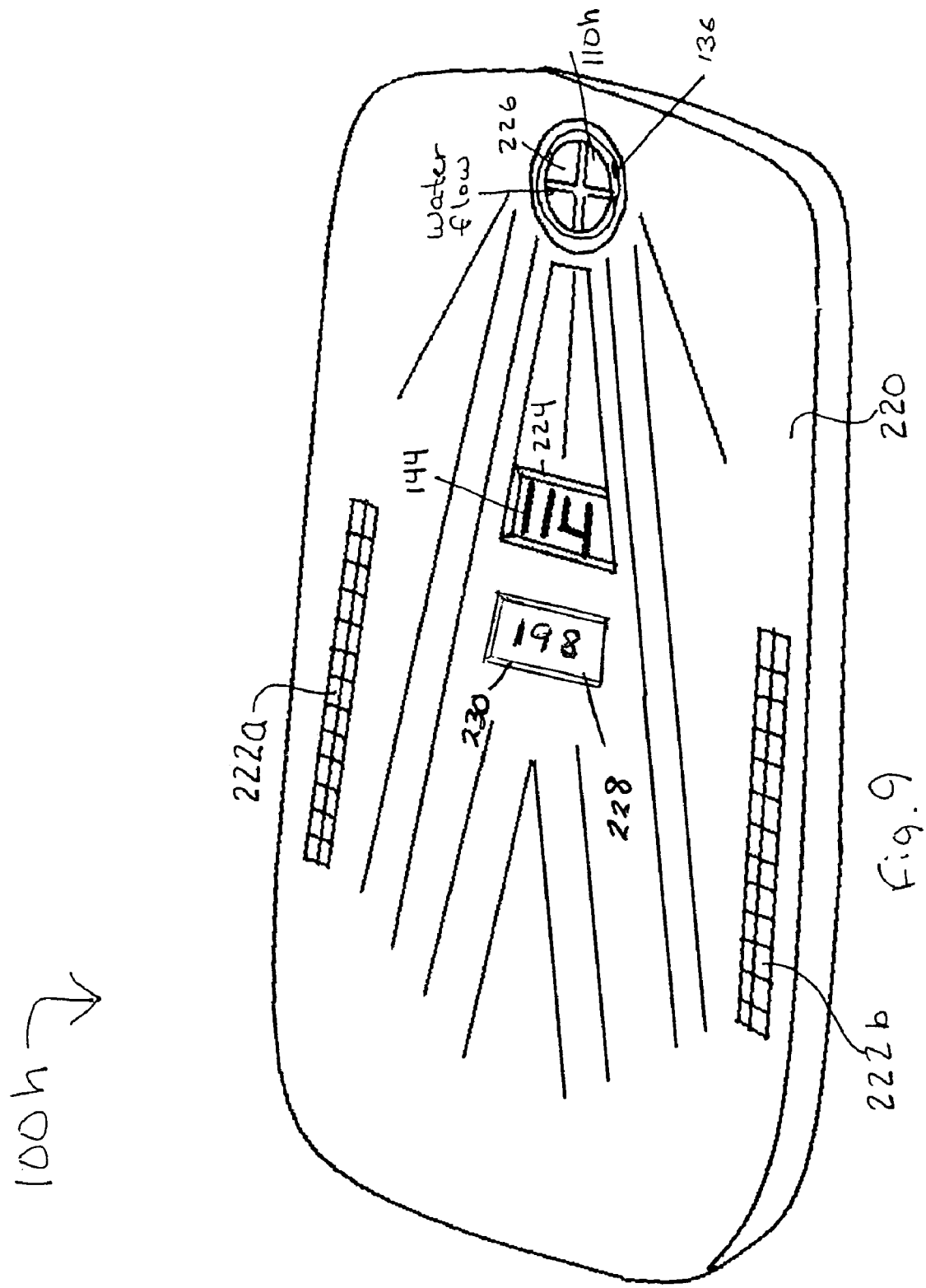
FIG. 9 is a perspective view of an eighth example implementation of the electrical apparatus.

Referring to FIG. 9, a perspective view of an eighth example implementation of an apparatus 100h is shown. The apparatus 100h is generally implemented for use on a shower floor or in a bathtub. A mechanical structure of the apparatus 100h generally comprises a mat (or housing) 220 having an opening (or bore) 110h at one end. The mat 220 may be fabricated from a foam rubber, plastic, polymer or similar material. A top surface of the mat 220 may be ribbed or uneven to form a nonslip surface for the user.

The mat 220 may enclose and/or mount some or all of the electronic circuit 140. The power source 122 may be implemented as one or more solar cells 222a–b. The solar cells 222a–b may be mounted on a top surface of the mat 220. The temperature sensor 136 may be disposed within the opening 110h to contact the water flowing through the opening 110h and down a drain (not shown) beneath the opening 110h. A lens assembly 224 may be positioned directly over the display 144 to provide easier viewing by a user in a standing position on the mat 220. The lens assembly 224 may also be swiveled to adjust a viewing angle. The remaining portions of the electronic circuit 140 may be embedded in a chamber within the mat 220. The electronic circuit 140 may include the storage cell 146 for energy storage during periods of high illumination of the solar cells 222a–b and energy delivery during periods of low or no lighting. A screen (porous cover or thermally conductive protective material) 226 may be provided over the opening 110h for protection of the temperature sensor 136 below.

The mat 220 may include an integrated weight scale 228. A lens assembly 230 may be positioned directly over the weight scale 228 to provide easier viewing by the user in a standing position on the mat 220. The weight scale 228 may be spring-loaded, pressure sensitive, gas-loaded or the like. Readout of the weight scale 228 may be in pounds, kilograms, stones or other suitable units of measurement.

Figure 10:
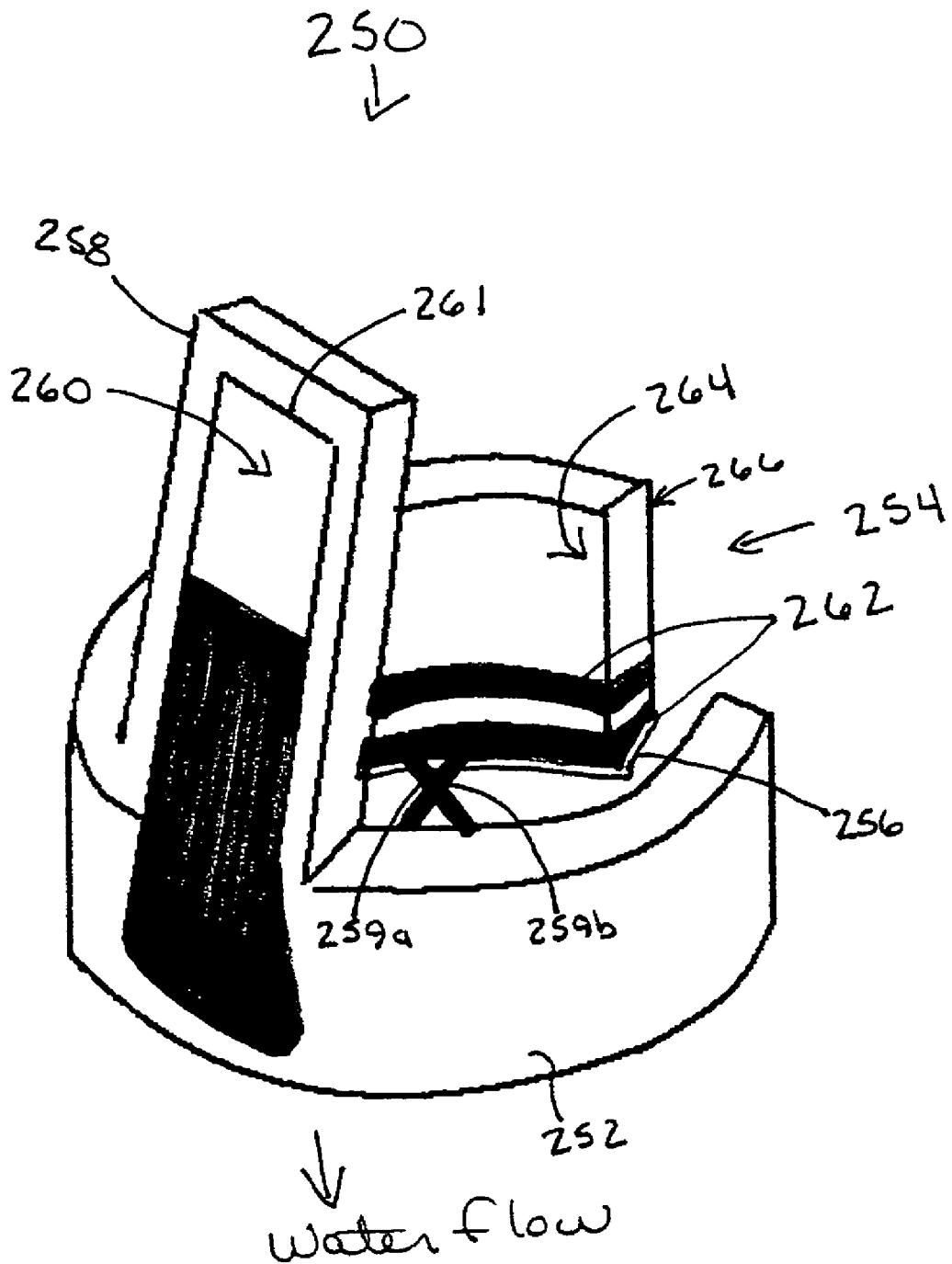
FIG. 10 is a perspective view of an example implementation of a non-electrical apparatus in accordance with a preferred embodiment of the present invention.

Referring to FIG. 10, a perspective view of an example implementation of an apparatus 250 is shown in accordance with a preferred embodiment of the present invention. The apparatus 250 may be designed to clip onto the end of a faucet (not shown). A mechanical structure of the apparatus 250 generally comprises a housing 252 having a general clip or "C" shape with an optional opening (or break) 254, a lip (or ridge) 256 formed along the bottom of the housing 252 and extending inward, a face panel 258 extending generally upward from said housing 252 opposite the opening 254 and one or more optional crossing members 259a–b extending across a bottom of the housing 252. The lip 256, face panel 256 and optionally the housing 252 and/or cross members 259a–b may have an internal cavity 260 extending throughout. A window 261 may be formed in an outer wall of the face panel 258 to permit viewing of the chemical 262. The lip 256 may have an inner diameter generally smaller than the inner diameter of the faucet opening such that at least a portion of the lip 256 may directly contact the water when flowing.

A chemical 262, disposed within the cavity 260, may be operational to indicate a temperature. The temperature sensitive chemical 262 may be a nontoxic material in the form of either a liquid or a solid. When a liquid is implemented, the chemical 262 may be fully encased by the housing 252, lip 256 and face panel 258. In one embodiment, the chemical 262 may change color with varying temperature. In another embodiment, the chemical 262 may expand/contract with changing temperature as in a conventional thermometer. Examples of expanding/contracting liquids may include, but is not limited to, organic liquid such as alcohol mineral spirits, kerosene, toluene, and certain citrus extract based solvents. A dye may be mixed with the liquid for easier viewing.

The cavity 260 generally extends around most of the circumference of the housing 252. The inside walls 264 of the housing 252 adjoining the cavity 260 may be made relatively thin as compared with the outside walls 266 near the lip 256 to provide good heat transfer from the faucet and water to the chemical 262. Likewise, the walls of the lip 256 may also be made relatively thin to provide good heat transfer from the water to the chemical 262. The cavity 260 may be formed at least adjacent to the bottom edge of the housing 252 where the temperature to be measured may be least affected by a thermal mass of the faucet itself.

The housing 252 and lip 256 may be fabricated from a resilient, non-breakable material such as rubber, plastic, a resilient metal alloy or plastic/polymer compound. The resilience of the housing 252 may allow the assembly 250 to be easily installed onto and removed from the faucet. Therefore, the assembly 250 is generally adaptable to a variety of faucet shapes and sizes. The assembly 250 may also be readily moved from faucet to faucet by the user.

Figure 11:
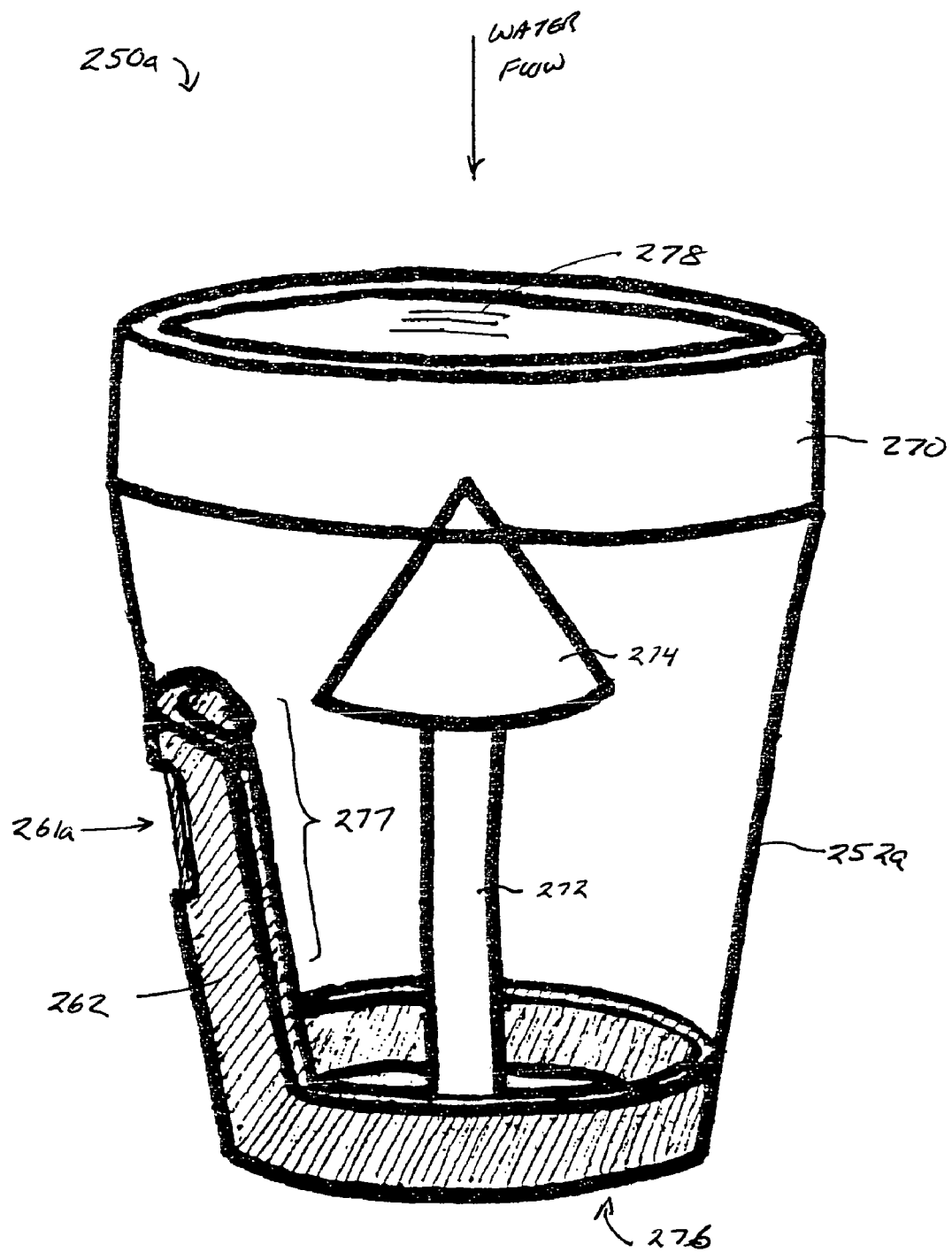
FIG. 11 is a cut away side view of a second example implementation of the non-electrical apparatus.

Referring to FIG. 11, a cut away side view of a second example implementation of an apparatus 250a is shown. Elements similar of the apparatus 250a similar to elements of the apparatus 250 may be shown with the same reference numbers. A mechanical structure of the apparatus 250a generally comprises a body (or housing) 252a, the lip 256 (not visible), a fitting 270, a strut 272 and a cone 274. The body 252a may have an opening (or bore) 276 extending axially from a top end to a bottom end of the body 252a. The strut 272 may be directly connected to the body 252a at or near the bottom end of the body 252a and coaxially disposed in the bore 276. A base of the cone 274 may be mounted at a top end of the strut 272. A pointed end of the cone 274 may be generally facing the top end of the body 252a toward the faucet.

The temperature sensitive chemical 262 may be formed along a bottom edge of the body 252a and optionally in the lip 256 with a horizontal portion 277 disposed along a vertical wall of the body 252a. A window 261a may be formed in the body 252a adjoining the chemical 262 for viewing purposes. If the chemical 262 is in a liquid form, a cavity 260a may be provided in the body 252a and the lip 256 to retain the chemical 262. If the chemical 262 is a solid, the chemical 262 may be applied to an inner wall of the body 252a.

The body 252a, the water diversion strut 272 and the water diversion cone 274 may be formed of a rigid material. The body 252a may have a tapered shape with a wider top diameter at a top end and a smaller bottom diameter at the bottom end. The top diameter of the body 252a may have approximately the same outer diameter of the faucet. The smaller bottom diameter of the body 252a may help bring the water flowing through the body 252a into contact with the chemical 262 and/or inner walls of the body 252a. The cone 274 may also direct the flowing water toward the inner wall of the body 252a and thus into contact with the chemical 262 for an efficient heat transfer. Other shapes may be implemented for the cone 274 to meet the criteria of a particular application.

The fitting 270 may be formed from either a hard material or a resilient material. If the fitting 270 is formed from a hard material, threads 278 may be formed along an inside wall of the fitting 270 to allow the assembly 250a to be connected (e.g., screwed onto) the end of the faucet. If the fitting 270 is formed from a resilient material, the inside diameter of the fitting 270 may be formed slightly smaller than the outside diameter of the faucet to allow for a snug fit. The fitting 270 may be permanently attached to the body 252a.

Figure 12:
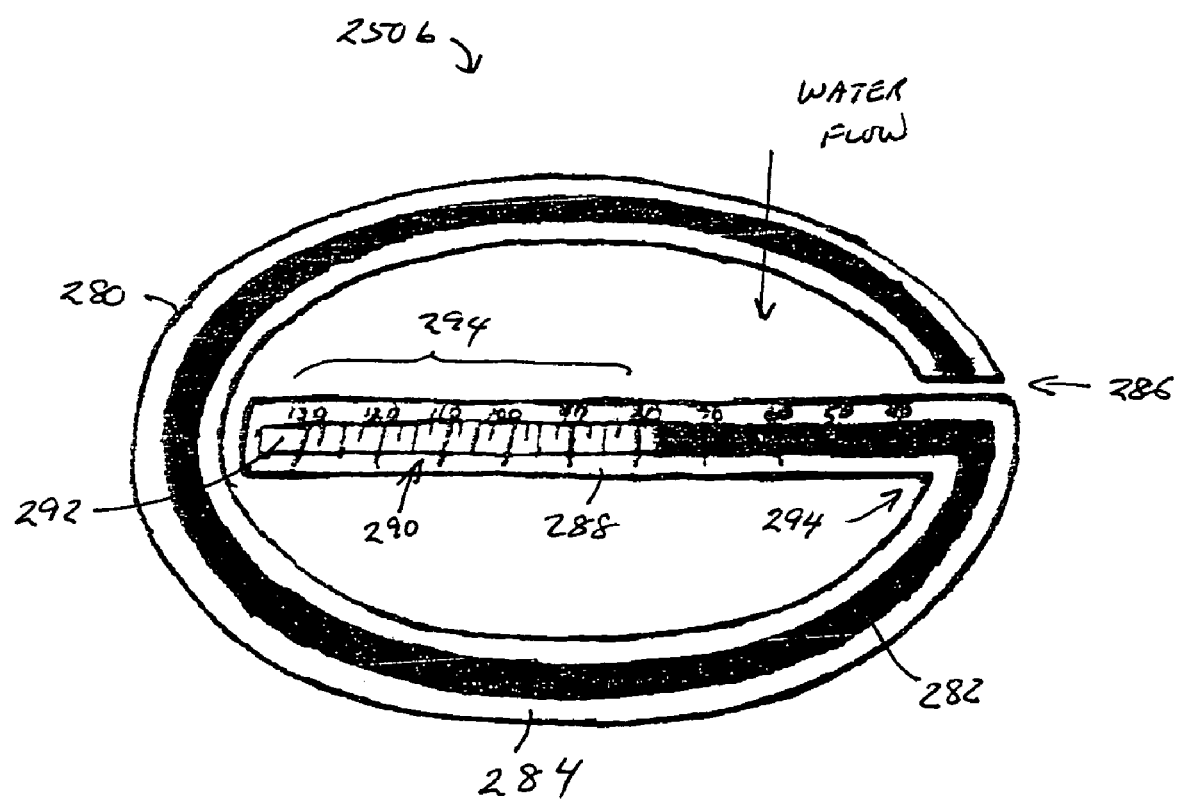
FIG. 12 is a top view of a third example implementation of the non-electrical apparatus.

Referring to FIG. 12, a top view of a third example implementation of an apparatus 250b is shown. The apparatus 250b generally comprises a housing 280 and a chemical 282. The housing 280 is formed in a general "G" shape or a mirror (horizontal or vertical) thereof. The housing 280 may comprise a circular portion 284 having a gap (or break) 286 and a straight portion 288. An outer diameter of the circular portion 284 may be arranged to be slightly larger than an inside diameter of a drain into which the apparatus 250b may be inserted. The gap 286 may allow the resilient circular portion 284 to be compressed to a smaller outside diameter for insertion into the drain. The straight portion 288 may include a scale 290 for indicating a water temperature. A channel 292 may be formed through most of the straight portion 282 and around some or most of the circular portion 284 to contain the chemical 282. At room temperature, the chemical 282 may occupy only a portion of the channel 292 leaving a vacuum at a closed end of the straight portion 288.

The circular portion 284 of the housing 280 may be formed of a resilient material that may also be break resistant. An example material may include a molded plastic stamped alloy. The circular portion 284 may also have a high thermal conductivity to readily transfer heat from the water flowing down the drain to the chemical 282.

The straight portion 288 of the housing 280 may also be formed of a resilient material that may also be break resistant. In one embodiment, a region 294, where the straight portion 288 joins the circular portion 284, may be made of a flexible material to allow for a large (e.g., 45 degree) deflection of the straight portion 288 down and out of a plane of the circular portion 284. The flexibility may allow the straight portion 288 to experience a large pressure from an object or a finger without breaking loose from the circular portion 284 that would spill the chemical 282.

In one embodiment, the chemical 282 may be a heat sensitive liquid that increases in volume as temperature increases. The chemical 282 may be similar to the chemical 262. As water flows over the circular portion 284, and possibly the straight portion 288, the water heats or cools the housing 280 and the chemical 282 to approximately the same temperature as the water itself. The chemical 282 may expand or contract accordingly to the changing temperature causing a meniscus at the end of the chemical 282 in the straight section 288 to move along the scale 290. The temperature of the water may thus be read from the position of the meniscus along the scale 290. In another embodiment, the chemical 282 may be similar to or the same as the color changing chemical 262. As such, the scale 290 and the vacuum region 294 may be eliminated as the user may determine the water temperature based upon the color of the chemical.

Figure 13:
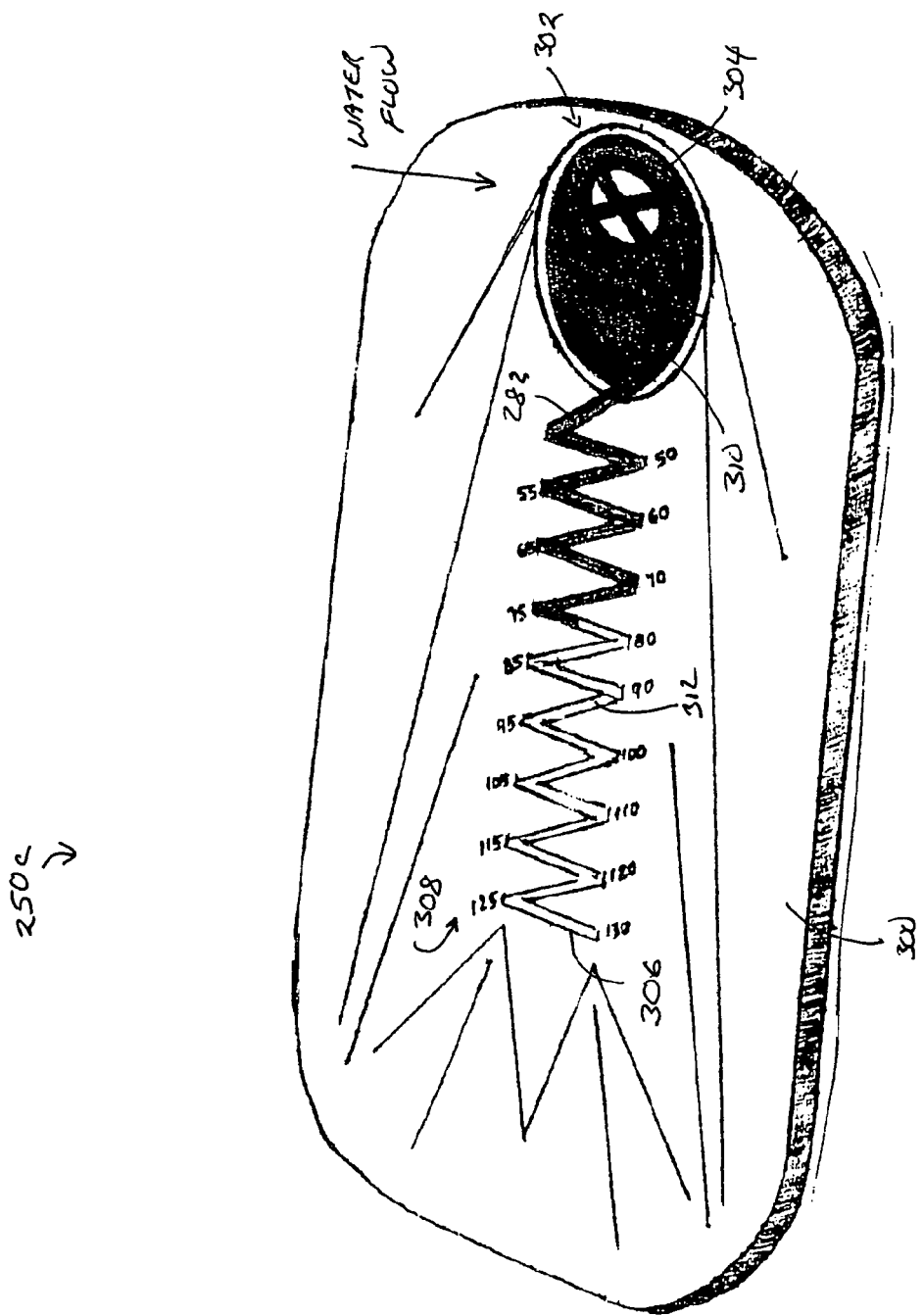
FIG. 13 is a perspective view of a fourth example implementation of the non-electrical apparatus.

Referring to FIG. 13, a perspective view of a fourth example implementation of an apparatus 250c is shown. The apparatus 250c is generally arranged for use on a shower floor or in a bathtub. A mechanical structure of the apparatus 250c generally comprises a mat (or housing) 300 having an opening (or bore) 302 at one end, a cover 304, an indicator tube 306, a scale 308 and the chemical 282. The opening 302 generally allows the water to flow through to a drain (not visible). The cover 304 may have an interior chamber 310 in communication with a channel 312 running a length of the indicator tube 306. The mat 300 may be fabricated from a foam rubber, plastic, polymer or similar material. A top surface of the mat 300 may be ribbed or uneven to form a nonslip surface for the user. The cover 304 and the indicator tube 306 may be fabricated from a resilient, clear material such as plastic.

In operation, water flowing across the top surface of the mat 300 reaches the cover 304 surrounding the opening 302. Heat may be transferred from the water to the chemical 282 resident in the chamber 310 of the cover 304. As the chemical 282 changes temperature, a volume of the chemical 282 may expand (e.g., heating) or contract (e.g., cooling) as the chemical 282 adjusts to the water temperature. As the chemical 282 changes volume, a meniscus at an end of the chemical 282 inside the channel 312 of the indicator tube 306 may move accordingly. A user may determine the temperature of the water by comparing the location of the meniscus of the chemical 282 against the scale 308 positioned on the mat 300.

In one embodiment, the chemical 282 may be the same as the color changing chemical 262. As the water temperature changes, the chemical 282 may change color providing a visible indication of the approximate water temperature. The color sensitive chemical 282 may be in the form of a liquid inside the chamber 310 and/or channel 312. If the color sensitive chemical 282 is a solid, the chemical may be disposed on the cover 304 for good thermal contact with the water flowing through the opening 302. A weight scale (see FIG. 9) may be included in the apparatus 250c.

Figure 14:
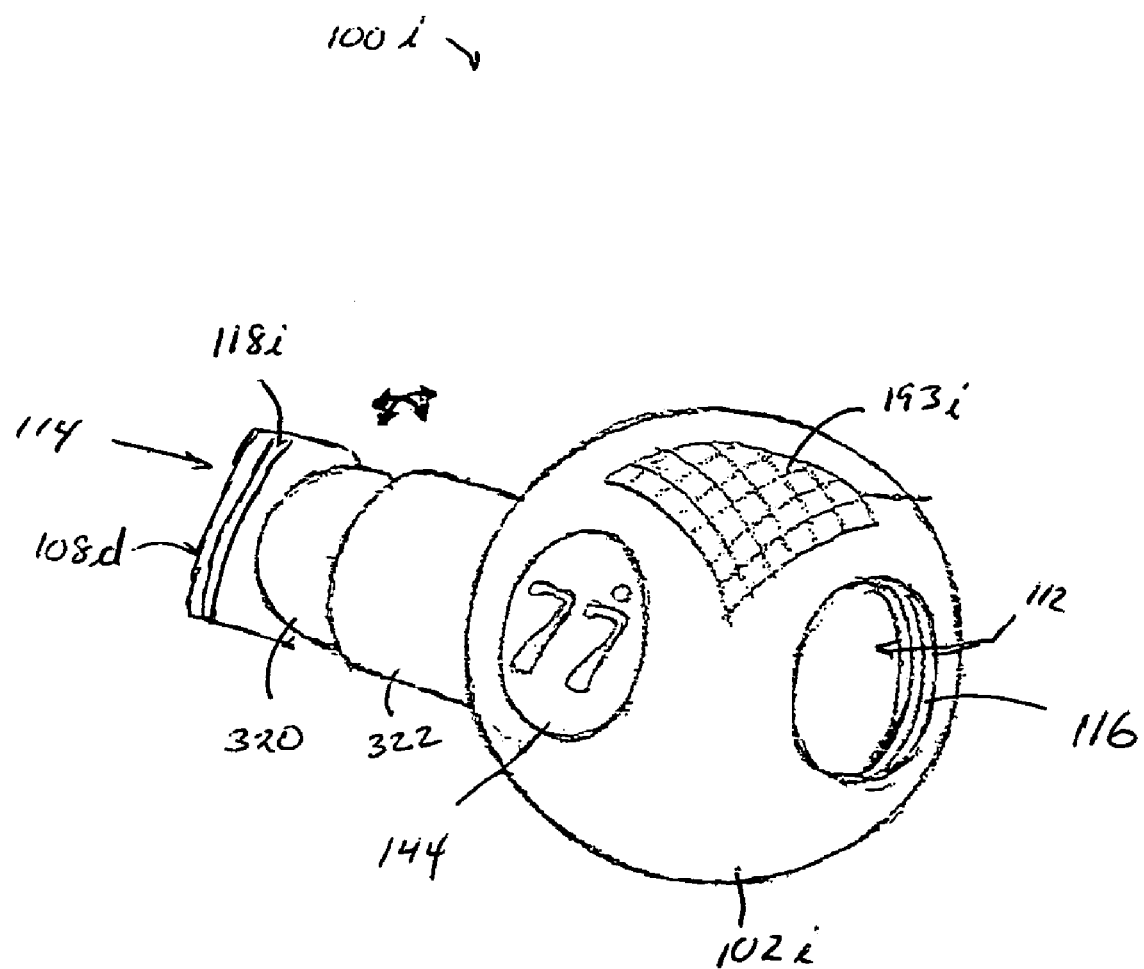
FIG. 14 is a perspective view of a ninth example implementation of the electrical apparatus.

Referring to FIG. 14, a perspective view of a ninth example implementation of an apparatus 100i is shown. The apparatus 100i may be arranged to by readily adapted to many conventional types of shower heads. The bottom fitting 108d of the apparatus 100i may be formed with outside threads 118i to accommodate attachment to (e.g., screw on) the shower head (e.g., 200, FIG. 5). A ball joint 320 may be located between a the bottom fitting 108d and a housing 102i to permit multi-axis rotation for aligning a solar cell 193i with a light source (not shown). The housing 102i may include the bore 112 having the inside threads 116 to attach to (e.g., screw on) a wall pipe (e.g., 202, FIG. 5). The display 144 may be disposed in a side of the housing 102*i*. Portions of the electronic circuit 140 may be included in the apparatus 100*i* in a portion 322 of the housing 100*i*.

Figure 15:
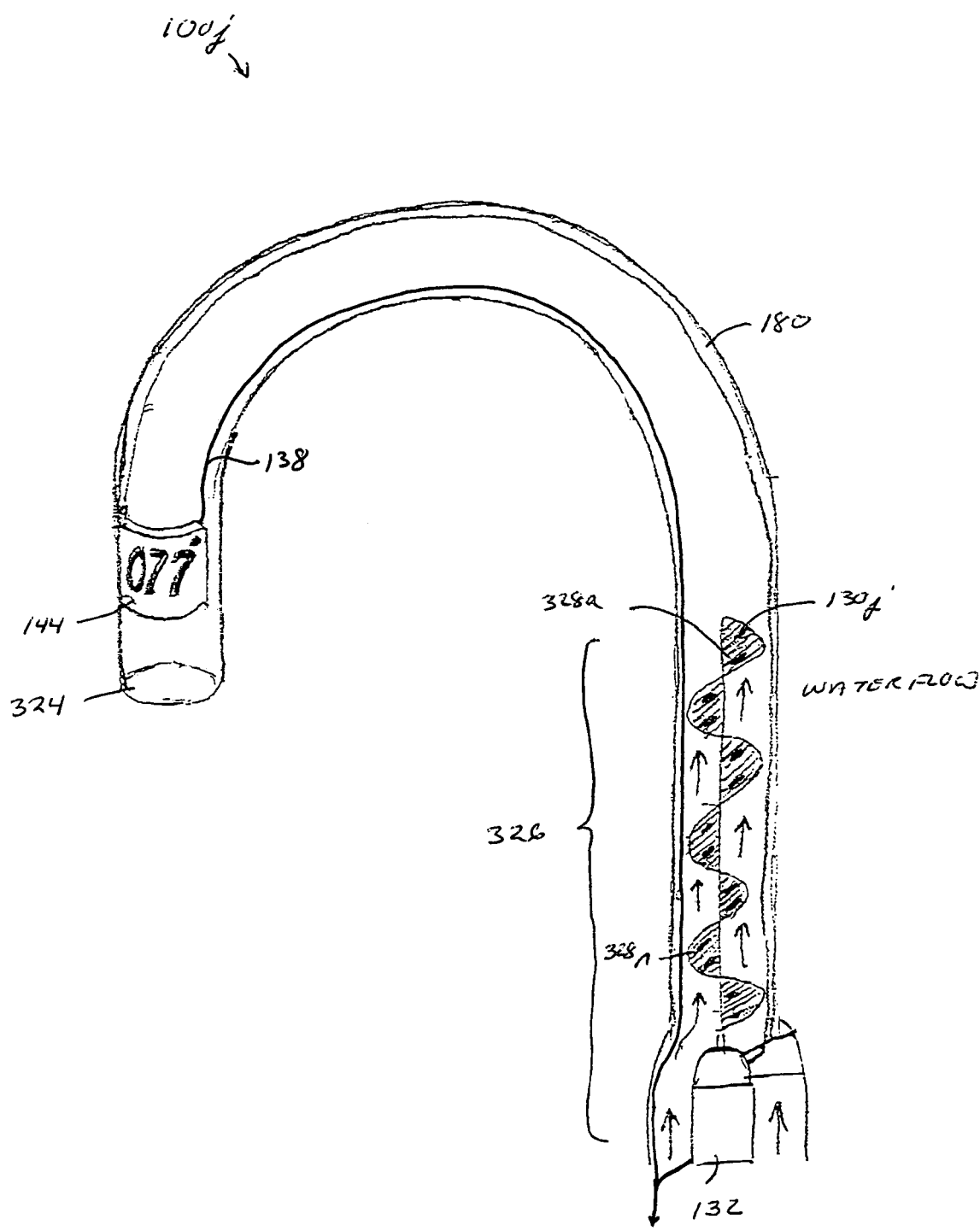
FIG. 15 is a side view of a tenth example implementation of the electrical apparatus.

Referring to FIG. 15, a side view of a tenth example implementation of an electrical apparatus 100*j* is shown. The apparatus 100*j* may distribute the electronic circuit 140 inside the faucet 180. For example, the display 144 may be disposed proximate an open end 324 of the faucet 180 for easy viewing. The micro-generator 132 and blade 130*j* may be disposed an a portion 326 of the faucet 180 distant from the display 144. The wiring harness 138 may be disposed inside (as shown) or outside the faucet 180 between the micro-generator 132, the display 144 and the remaining portion of the electronic circuit 140 (not visible).

The blade 130*j* may be implemented as a twist blade. The twist blade 130*j* may be coupled to a shaft of the micro-generator 132. The twist blade 130*j* may have a general helix or "S" shape for converting the linear upward flow of water into a rotational torque. Dams 328*a–n* may be included on one or both broad surfaces of the twist blade 130*j* to imped the water flow and thus increase the torque delivered to the micro-generator 132. The twist blade 130*j* may be fabricated from a metal alloy, polymer or other moldable or castable material. The dams 328*a–n* may be formed as an integral part of the blade 130*j*, formed separately and attached or cut out of the blade 130*j*.

Figure 16:
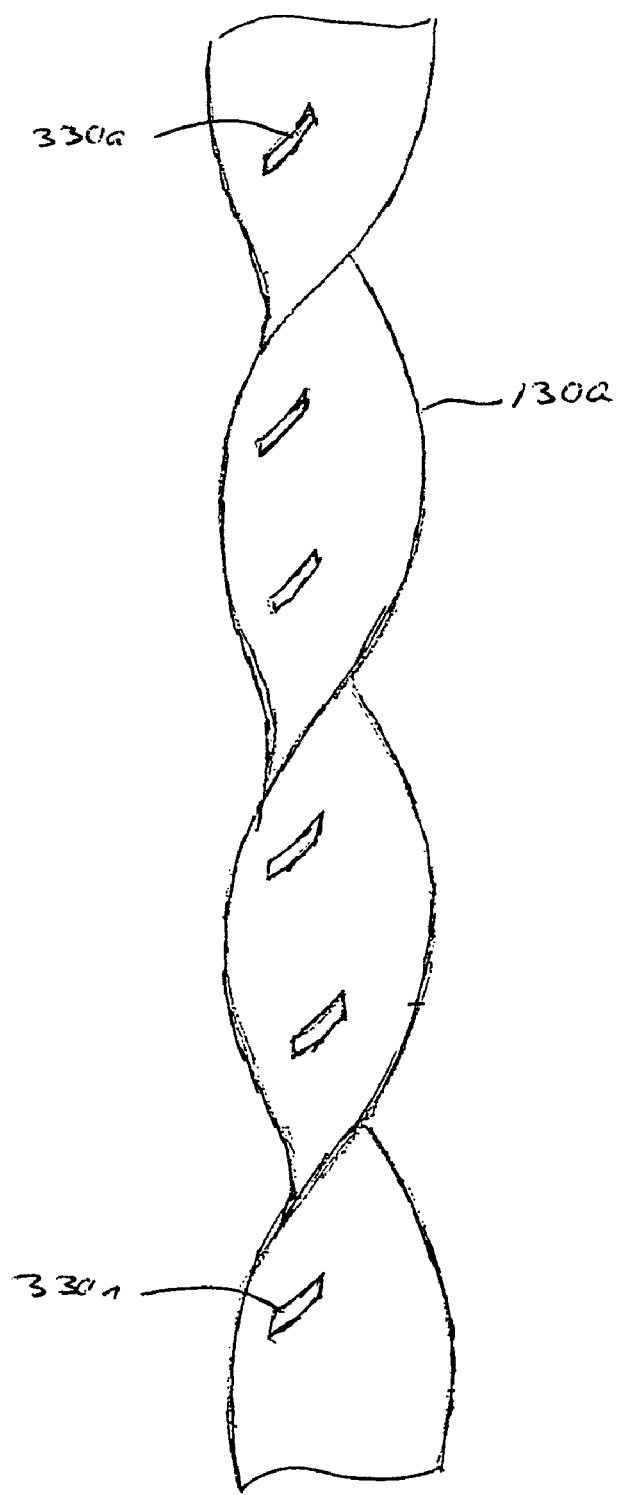
FIG. 16 is a side view of a blade.

Referring to FIG. 16, a side view of a second blade 130*a* is shown. The blade 130*a* may have a general "S" or drill type shape. The blade 130*a* may include optional diagonally angled flow dams 330*a–n*. The flow dams 330*a–n* may be oriented to assist in generating torque on the blade 130*a* from the water flow. The blade 130*a* may be fabricated from a metal alloy, polymer or other moldable, castable or forged material. The dams 330*a–n* may be formed as an integral part of the blade 130*a*, formed separately and attached or cut out of the blade 130*a*. The blade 130*a* may be coupled to a micro-generator 132 to convert power from the water flow into a rotational power.

Figure 17:
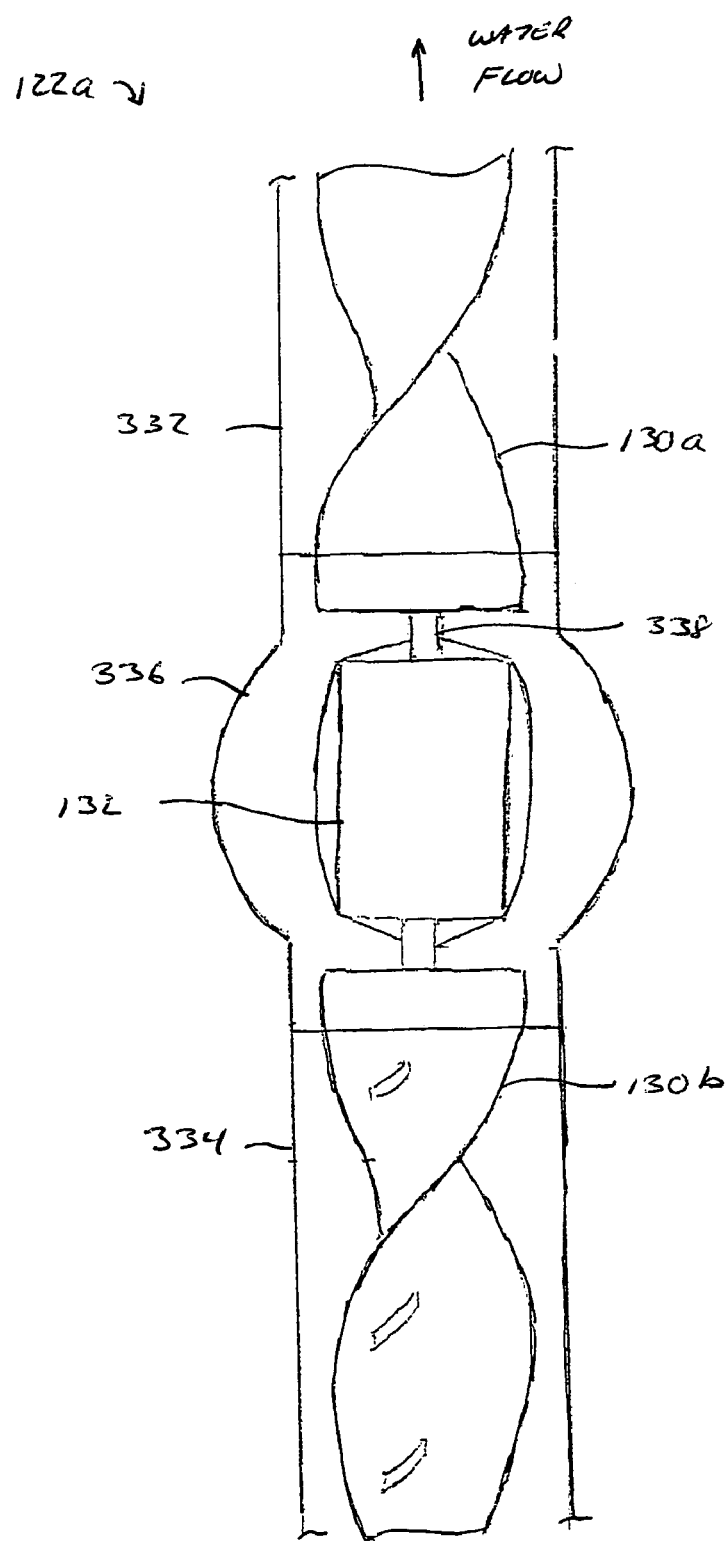
FIG. 17 is a side view of an example implementation of a two blade power source.

Referring to FIG. 17, a side view of an example implementation of a two blade power source 122*a* is shown. The power source 122*a* generally comprises the micro-generator 132 and two blades 130*a–b*. The first blade 130*a* may be disposed in a first section 332 of a pipe downstream of the micro-generator 132. The second blade 130*b* may be similar to the first blade 130*a* and disposed in a second section 334 of the pipe upstream of the micro-generator 132. The micro-generator 132 may reside in a bulge pipe section 336 to permit the water easy flow around the micro-generator 132. Both blades 130*a–b* may be connected to a common axis 338 to transfer torque to the micro-generator 132.

Figure 18:
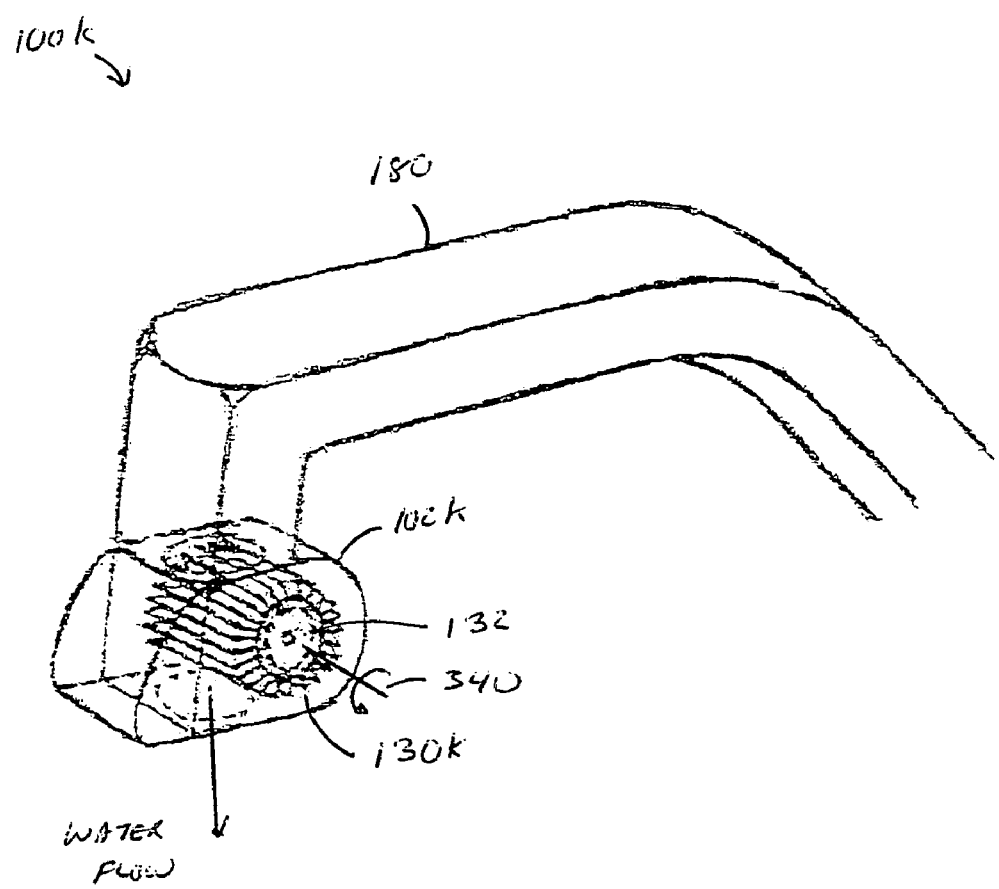
FIG. 18 is a perspective view of an eleventh example implementation of the electrical apparatus.

Referring to FIG. 18, a perspective view of an eleventh example implementation of an electrical apparatus look is shown. The apparatus look may implement a paddle or turbine type blade 130*k*. The turbine blade 130*k* may have an axis of rotation 340 perpendicular to the flow of water. The micro-generator 132 may be disposed inside the turbine blade 130*k*. Both ends of the turbine blade 130*k* may be sealed to aid in sealing the micro-generator 132 from the water.

Figure 19:
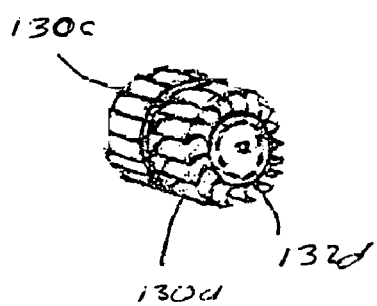
FIG. 19 is a perspective view of an example implementation of a multiple turbine blade arrangement.

Referring to FIG. 19, a perspective view of an example implementation of a multiple turbine blade 130*c–d* arrangement is shown. The first turbine blade 130*c* may be configured to rotation opposite the second turbine blade 130*d*. The turbine blades 130*c–d* may drive individual micro-generators 132*c* (not visible) and 132*d*, respectively. The dual micro-generators 132*c–d* may be operational as redundant power sources. The dual micro-generators 132*c–d* may be wired in parallel for increased current capacity or in series for increase voltage capacity. In one embodiment, each micro-generator 132*c–d* may be configured as an independent unit having sealed facing sides. The opposing sides may be mounted to inner walls of a housing 102*k* (FIG. 18). In another embodiment, the micro-generators 132*c–d* may share a common stationary shaft at the axis of rotation. The shaft may be connected to the inner walls of the housing 102*k*. In yet another embodiment, two individual turbine blades 130*c–d* may be configured to rotate a single, larger capacity micro-generator 132. One of the blades 130*c* may rotate a core inside the micro-generator 132 in a first direction and the other blade 130*d* may rotate a body of the micro-generator 132 in a second direction, opposite the first direction.

Figure 20:
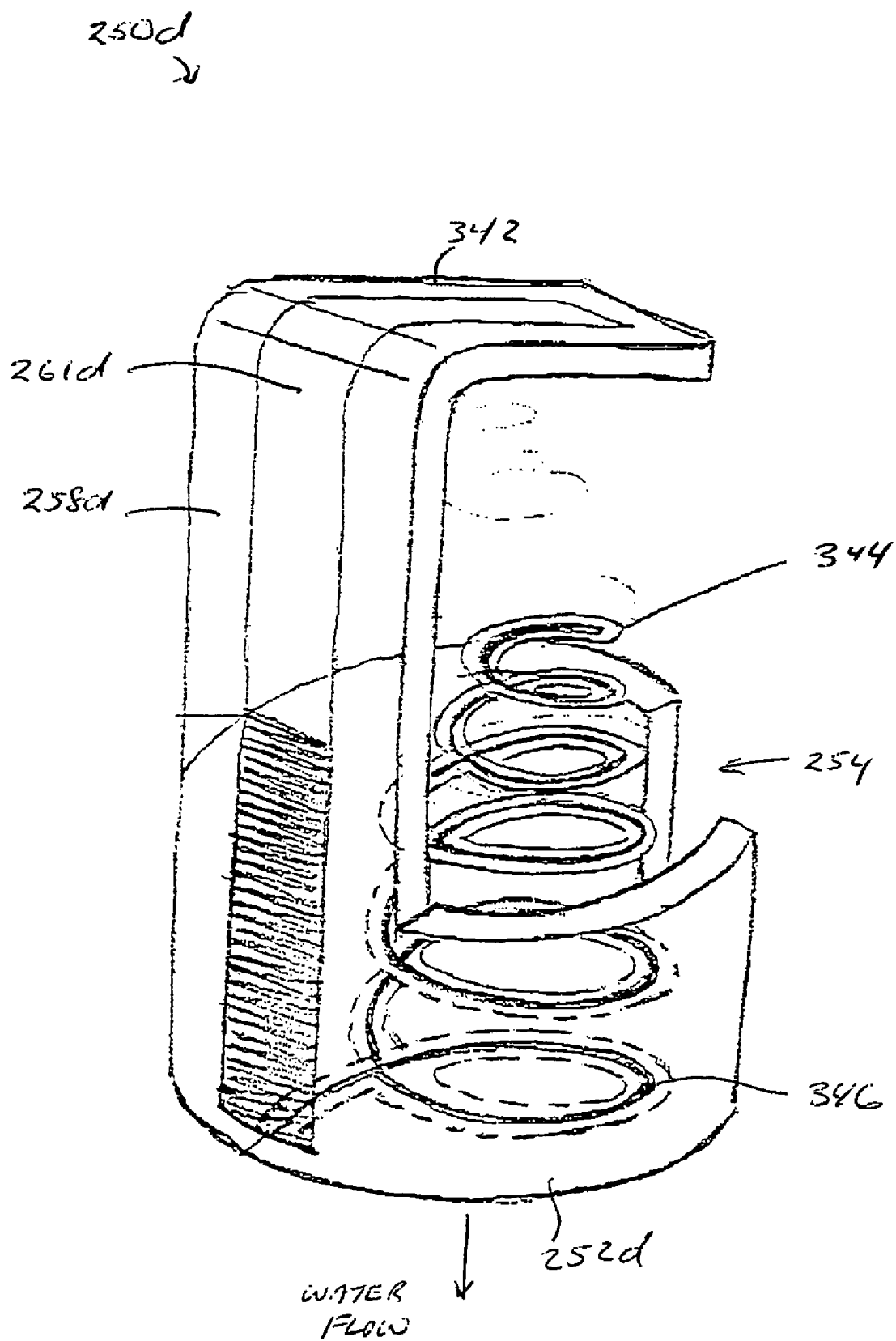
FIG. 20 is a perspective view of a fifth example implementation of the non-electrical apparatus.

Referring to FIG. 20, a perspective view of a fifth example implementation of an apparatus 250*d* is shown. A mechanical structure of the apparatus 250*d* generally comprises a housing 252*d* having a general clip or "C" shape with an optional opening (or break) 254 and a face panel 258*d* extending generally upward from said housing 252*d* opposite the opening 254. The face panel 252*d* may include a top section 342 extending generally back toward the opening 254. The top section 342 may be formed horizontally (as shown) to rest against a faucet (not shown) or tilted upward for ease of viewing. A temperature sensor portion 344 may be disposed within the housing 252*d* for contact with the water flow. The temperature sensing portion 344 may have an internal cavity 346 that extends to the face panel 258*d* and the top section 342. The cavity 346 may be filled with the temperature sensitive chemical 262 (described in detail above). A window 261*d* may be formed in an outer wall of the face panel 258*d* and the top section 342 to permit viewing of the chemical 262. The temperature sensor portion 344 may have a cylindrical coil or conical spring shape to increase a surface area in contact with the water flow. The spring shape may help the temperature sensor portion 344 absorb shock from the water pressure striking the surface.

The housing 252*d*, face panel 258*d* and top section 342 may be fabricated from a resilient, non-breakable material such as rubber, plastic, a resilient metal alloy or plastic/polymer compound. The resilience of the housing 252*d* may allow the assembly 250*d* to be easily installed onto and removed from the faucet. Therefore, the assembly 250*d* is generally adaptable to a variety of faucet shapes and sizes. The assembly 250*d* may also be readily moved from faucet to faucet by the user.

Figure 21:
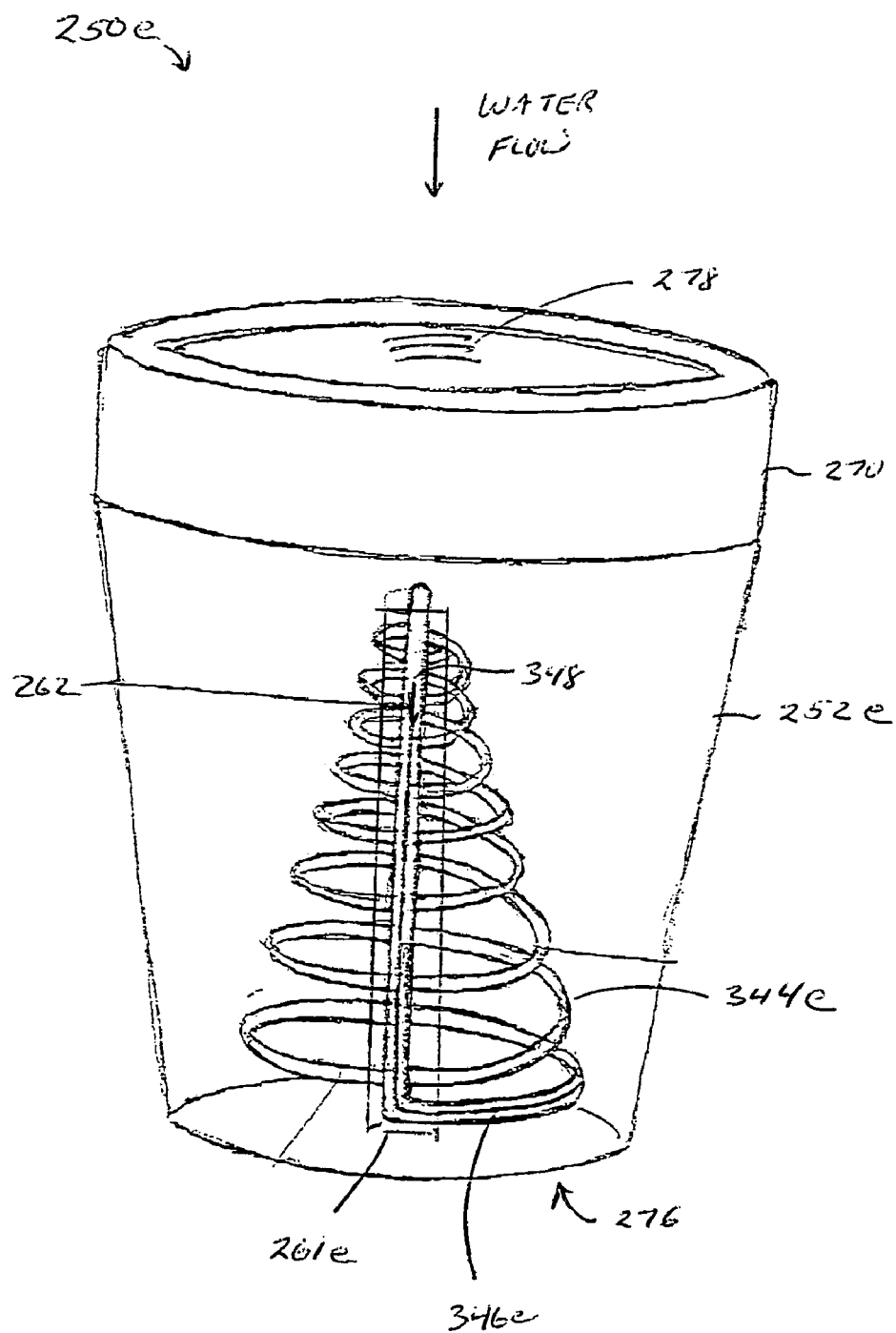
FIG. 21 is a perspective view of a sixth example implementation of the non-electrical apparatus.

Referring to FIG. 21, a perspective view of a sixth example implementation of an apparatus 250*e* is shown. A mechanical structure of the apparatus 250*e* generally comprises a body (or housing) 252*e*, the lip 256 (not visible), the fitting 270 and a temperature sensor portion 344*e*. The body 252*e* may have an opening (or bore) 276 extending axially from a top end to a bottom end of the body 252*e*. The temperature sensor portion 344*e* may be directly connected to the body 252*e* at or near the bottom end of the body 252*e* and generally coaxially disposed in the bore 276. The temperature sensor portion 344*e* may include a display portion 348 aligned with a window 261*e* in the housing 252*e* for viewing purposes. An internal cavity 346*e* that extends the length of the temperature sensor portion 344*e*, including the display portion 348. The temperature sensitive chemical 262 may be disposed (e.g., enclosed) in the cavity 346*e*.

The body 252*e* may be formed of a rigid material. The body 252*e* may have a tapered shape with a wider top diameter at a top end and a smaller bottom diameter at the bottom end. The top diameter of the body 252*e* may have approximately the same outer diameter of the faucet. The smaller bottom diameter of the body 252e may help bring the water flowing through the body 252a into contact with the temperature sensor portion 344e.

The temperature sensor portion 344e may have a general cylindrical coil or conical coil shape. The temperature sensor portion 344e may be disposed coaxially inside the housing 252e for contact with the water. The relatively large surface area of the temperature sensor portion 344e may provide a good thermal coupling to the water flow, minimal obstruction to the water flow and some shock resistance.

Figure 22:
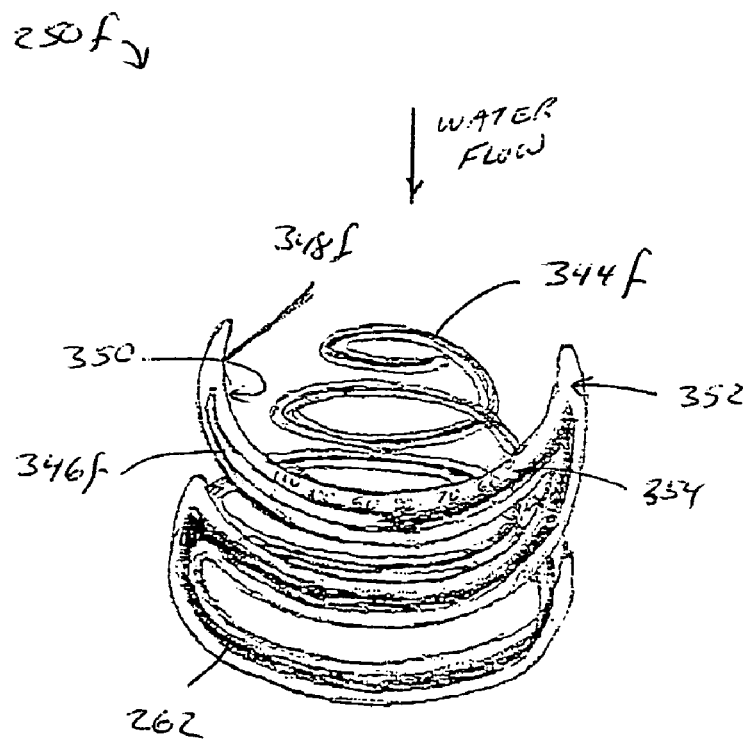
FIG. 22 is a perspective view of a seventh example implementation of the non-electrical apparatus.

Referring to FIG. 22, a perspective view of a seventh example implementation of an apparatus 250f is shown. The apparatus 250f generally comprises a temperature sensor portion 344f and a display portion 348f. The display portion 348f may have a generally curved or "C" shape configured to clip on to a faucet (not shown). The temperature sensor portion 344f may be shaped to fit inside the faucet. An adhesive (not shown) may be applied to an inside surface 350 of the display portion 348f to aid mounting the apparatus 250f to the faucet.

The portions 344f and 348f may have an internal cavity 346f for holding the temperature sensitive chemical 262. A font surface 352 of the display portion 348f may be curved to form a magnifying lens cap to aid in viewing the temperature sensitive chemical 262. A scale 354 may be provided on the front surface 352 of the display portion 348f to provide an indication of the actual water temperature.

Figure 23:
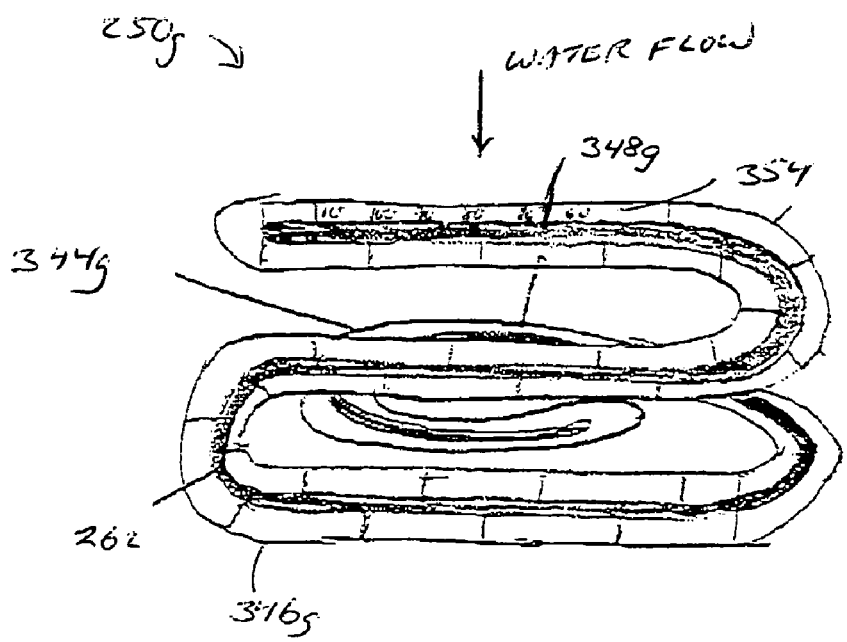
FIG. 23 is a perspective view of a eighth example implementation of the non-electrical apparatus.

Referring to FIG. 23, a perspective view of a eighth example implementation of an apparatus 250g is shown. The apparatus 250g generally comprises a temperature sensor portion 344g and a display portion 348g. The display portion 348g may have an "S" shape within a plane parallel to the water flow. The display portion 348g may be configured to reside outside a faucet (not shown). The temperature sensor portion 344g may be shaped to fit inside the faucet. The temperature sensitive chemical 262 may be disposed inside a cavity 346g extending through the temperature sensor portion 344g and the display portion 348g. The scale 354 may be provided on the display portion 348g to indicate an actual temperature of the water.

Figure 24A:
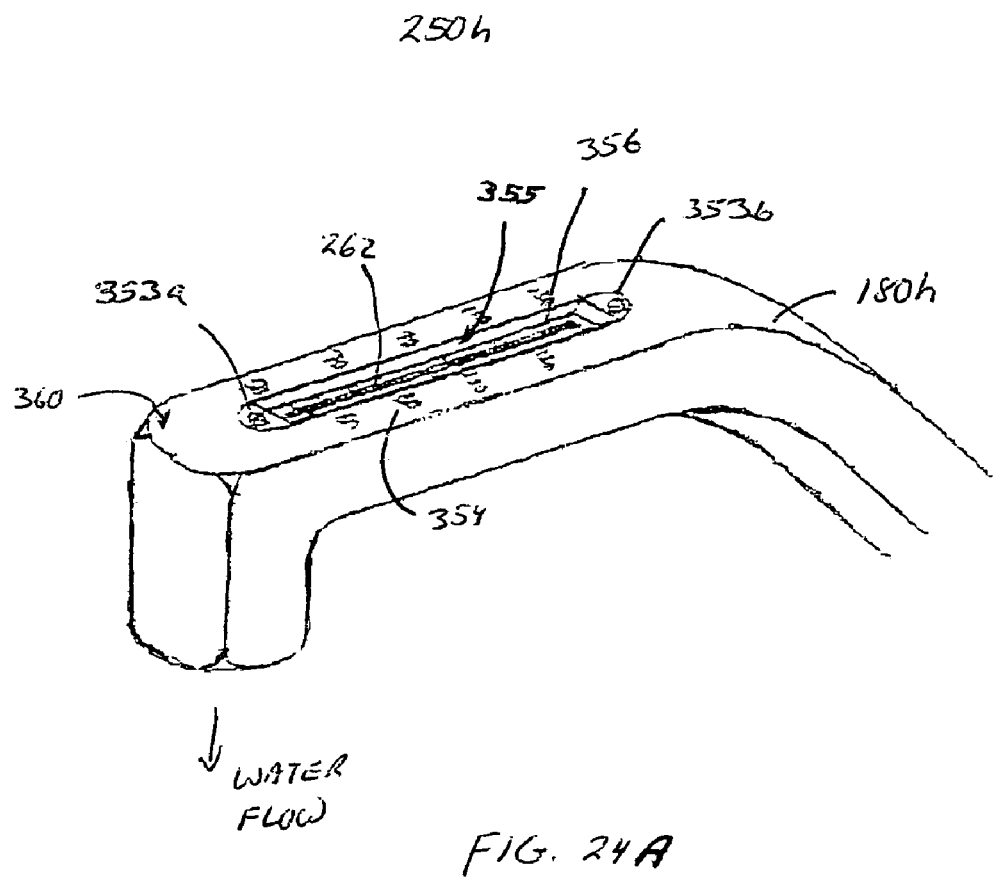
FIG. 24A is a perspective view of a ninth example implementation of the non-electrical apparatus.
Figure 24B:
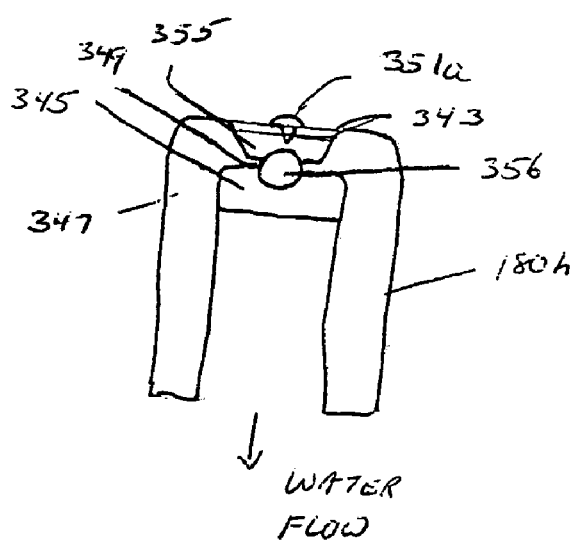
FIG. 24B is a cut-away side view of the non-electrical apparatus of FIG. 24A.

Referring to FIGS. 24A and 24B, a perspective view and a cut-away side view of a ninth example implementation of an apparatus 250h is shown. The apparatus 250h generally comprises a chemical thermometer 356 disposed in a channel 355 of a faucet 180h. The chemical thermometer 356 may include the temperature sensitive chemical 262. The chemical thermometer 356 may be secured in the channel 355 by a pair of clamps 353a–b fastened to the faucet 180h by screws 351a–b, glue or the like. A sealer 349 may be provided between the chemical thermometer 356 and a wall 347 of the faucet 180h.

The scale 354 may be formed on a top surface 360 of the faucet along one or both sides of the chemical thermometer 356 or directly on the chemical thermometer 356. The channel 355 may extend completely through the wall 347 to provide the chemical thermometer 356 with direct contact with the flowing water in a channel 345 of the faucet 180h. In one embodiment, the channel 355 may extend most of the way through the faucet 180h to provide a short thermal path from the water to the chemical thermometer 356. A clear plate 343 may be sealed over the channel 355 to minimize collection of water and debris in the channel 355 while still enabling the chemical thermometer 356 to be viewed.

Figure 25:
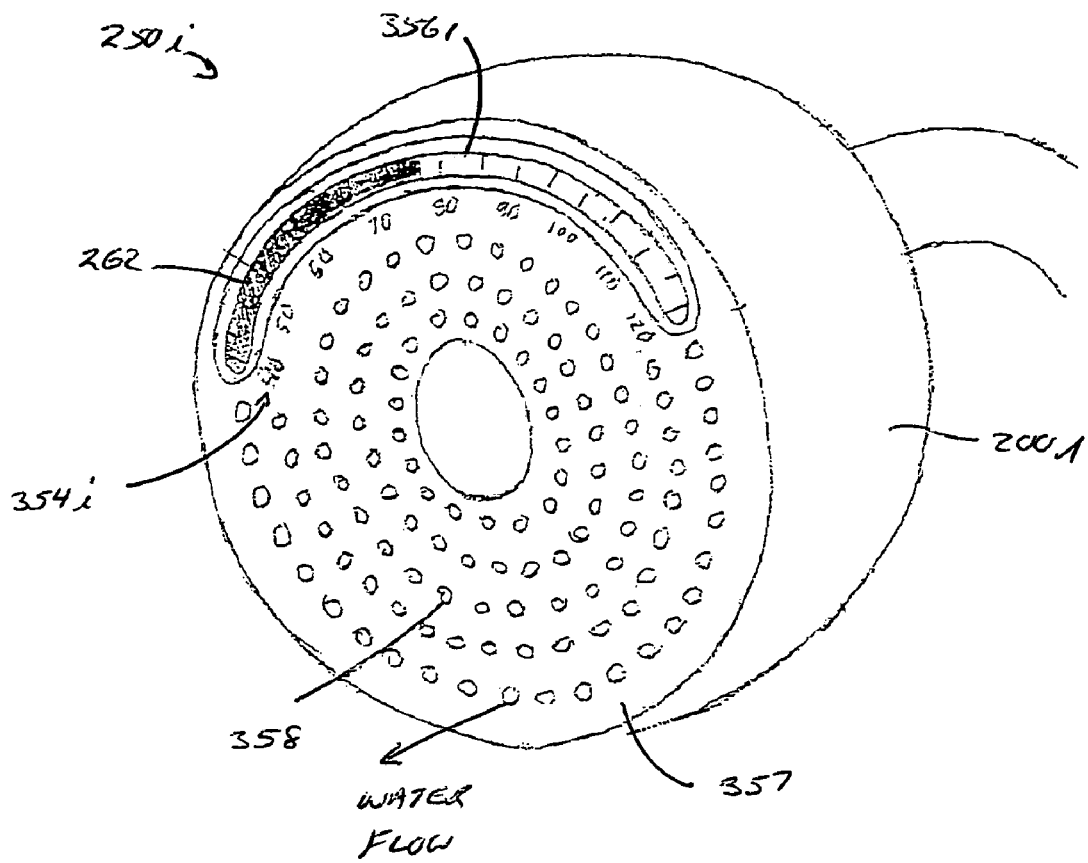
FIG. 25 is a perspective view of a tenth example implementation of the non-electrical apparatus.

Referring to FIG. 25, a perspective view of a tenth example implementation of an apparatus 250i is shown. The apparatus 250i generally comprises a chemical thermometer 356i mounted on a face 357 of a shower head 200i. The chemical thermometer 356i may be curved to generally follow an outer edge of the shower head 200i. The outer edge of the shower head 200i may be a generally circular, oval, hexagonal or similar shape. The chemical thermometer 356i may include the temperature sensitive chemical 262. The chemical thermometer 356i may be disposed outside a field of spray nozzles 358 formed in the face 357 of the shower head 200i to avoid interfering with the water flow out of the spray nozzles 358. A scale 354i may be created on the face 357 of the shower head 200i adjacent to the chemical thermometer 356i or directly on the chemical thermometer 356i. The chemical thermometer 356i may also be mounted on a side of the shower head 200i for side viewing. The chemical thermometer 356i may also be coupled to the shower head 200i through a pivotable joint to allow for swiveling.

Figure 26:
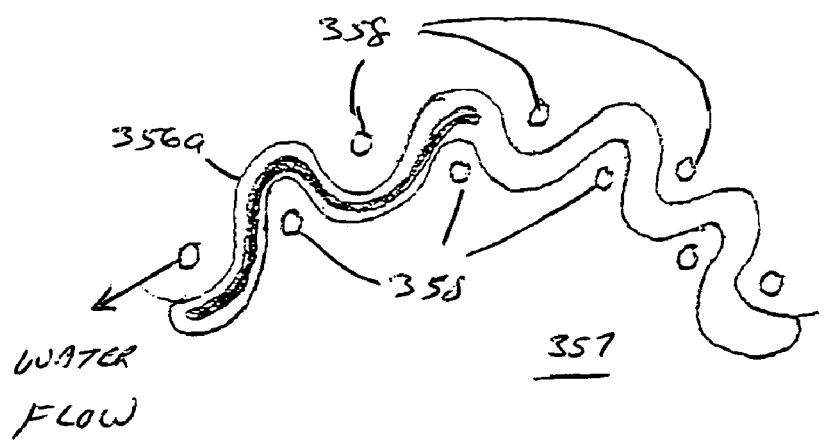
FIG. 26 is a side view of an example implementation of a chemical thermometer.

Referring to FIG. 26, a side view of another example implementation of a chemical thermometer 356a is shown. The chemical thermometer 356a may be suitable for mounting on the face 357 or side of the shower head 200i (FIG. 25). The chemical thermometer 356a may be formed along a curve with a wave-like pattern. The curve and wave pattern may be sized to permit the chemical thermometer 356a to be mounted inside the field of spray nozzles 358 formed in the face 357 of the shower head 200i.

Figure 27:
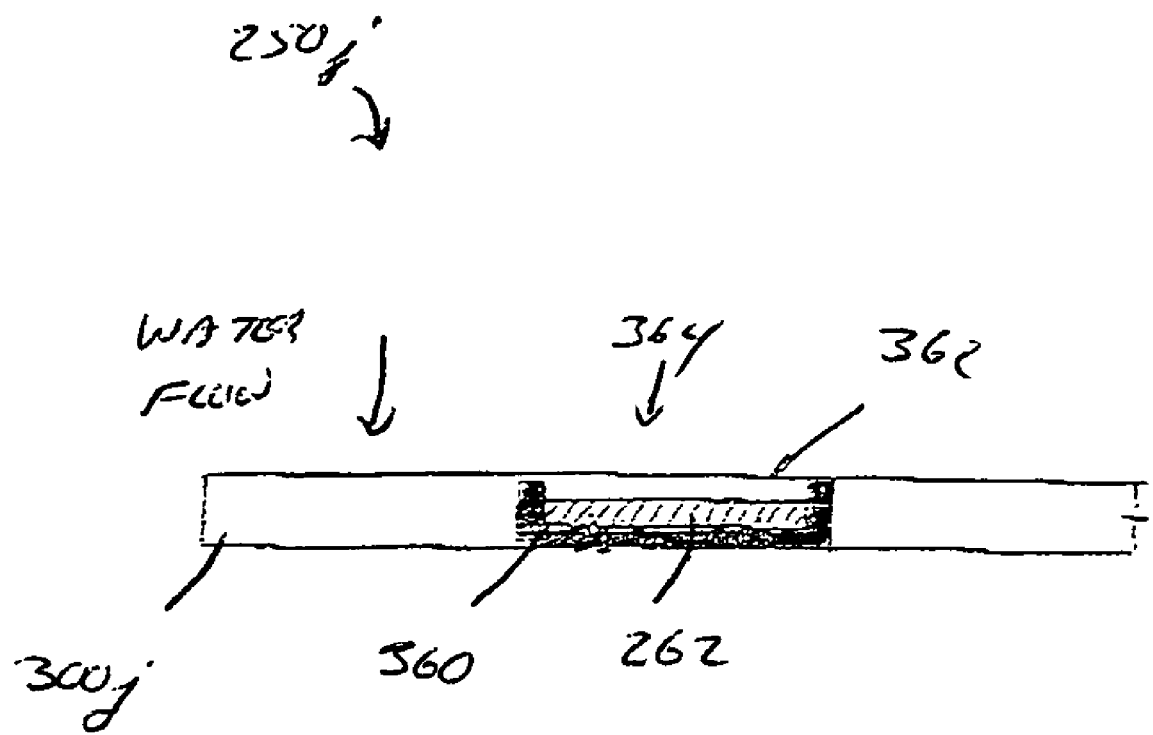
FIG. 27 is a side view of an eleventh example implementation of non-electrical apparatus.

Referring to FIG. 27, a side view of an eleventh example implementation of an apparatus 250j is shown. The apparatus 250j generally comprises a mat 300j, an insert 360, a lens cap 362 and the temperature sensitive chemical 262. The insert 360 may be disposed in a bore 364 formed in a top face of the mat 300j. The insert 360 may have expandable, nonporous, fluid filled walls to fit securely within the bore 364. The temperature sensitive chemical 262 may be disposed along a bottom surface of the insert 360. The lens cap 362 may be mounted above the temperature sensitive chemical 262. A shape of the lens cap 362 may provide magnified viewing of the temperature sensitive chemical 262 and an optional scale (not shown) from a viewer standing near or on the mat 300j. The lens cap 362 may permit the use of a smaller amount of the temperature sensitive chemical 262 while sill allowing for clear readability.

The temperature sensitive chemical 262 may be deposited into the insert 360 in a low pressure environment. As the lens cap 362 is applied to the insert 360, pressure asserted on the insert 360 by the lens cap 362 may cause the insert 360 to expand to seal the temperature sensitive chemical 262. The expansion of the insert 360 may also secure the insert 360 into the bore 364.

Figure 28:
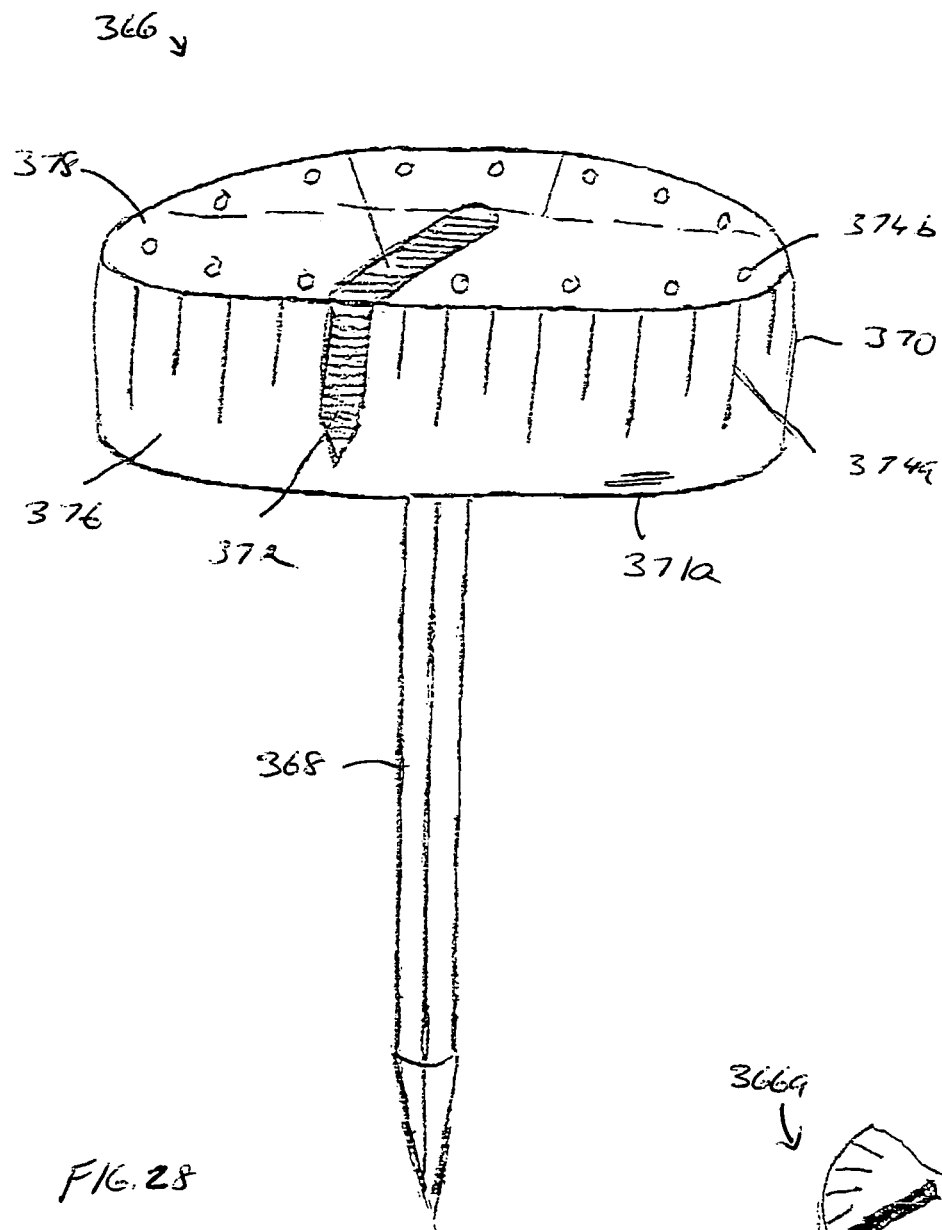
FIG. 28 is a perspective view of a first mechanical thermometer.

Referring to FIG. 28, a perspective view of a first mechanical thermometer 366 is shown. The mechanical thermometer 366 generally comprises a probe section 368, an upper section 370, a dial 372 and one or more optional readout indicators 374a–b. The side-face readout indicator 374a may be disposed on a side-viewing face 376 of the upper section 370. The top-face readout indicator 374b may be disposed on a top-viewing face 378 of the upper section 370. Threads 371a may be formed along an edge of the upper section 370 for mounting to a faucet.

The probe section 368 may house a temperature sensor (not shown). The temperature sensor may be connected to the dial 372. The temperature sensor may respond to temperatures experienced by the probe section 368 (at a tip or along a length) by rotating the dial 372 to an angle proportional to the temperature. The temperature may range from 0 to 999 degrees Fahrenheit or Celsius.

Figure 29:
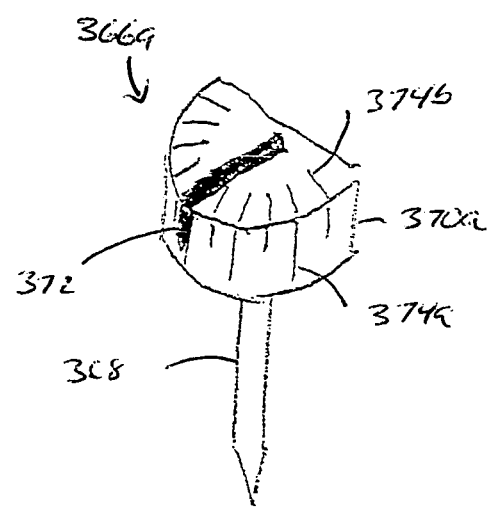
FIG. 29 is a perspective view of a second mechanical thermometer.

Referring to FIG. 29, a perspective view of a second mechanical thermometer 366a is shown. The second mechanical thermometer 366a may be similar to the first mechanical thermometer 366 including the probe section 368, the dial 372 and the one or more optional readout indicators 374a–b. An upper section 370a of the second mechanical thermometer 366a may be shaped as a half circle, instead of a full circle as on the first mechanical thermometer 366.

Figure 30:
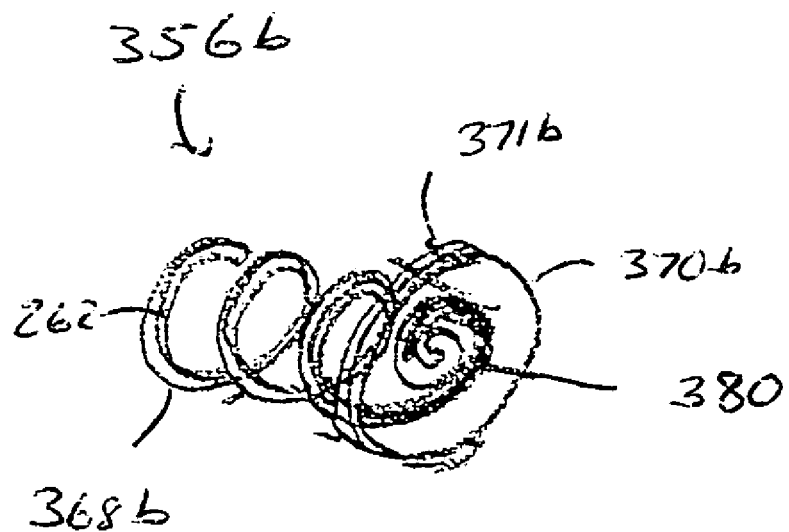
FIG. 30 is a perspective view of a chemical thermometer.

Referring to FIG. 30, a perspective view of another chemical thermometer 356b is shown. The chemical thermometer 356b generally comprises a probe section 368b, an upper section 370b and a display area 380. The probe section 368b may be configured in a coil shape to provide good thermal coupling to the water without hindering the water flow. The upper section 370b may include threads 371b for mounting to a faucet. The display area 380 may be configured in an arc or spiral shape, with or without a scale (not shown), and positioned for easy viewing. The entire chemical thermometer 356b may be rotatable after installation to adapt to various viewing conditions. The chemical thermometer 356b may utilize the temperature sensitive chemical 262 to indicate temperature. The chemical thermometer 356b may be interchangeable with the first and/or second mechanical thermometers 366 and 366a.

Figure 31:
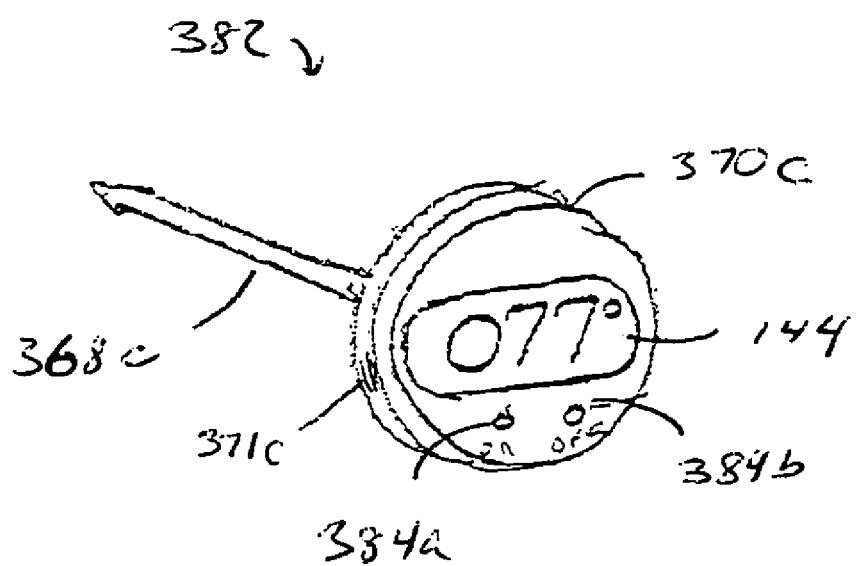
FIG. 31 is a perspective view of a digital thermometer.

Referring to FIG. 31, a perspective view of a digital thermometer 382 is shown. The digital thermometer 382 generally comprises a probe section 368c and an upper section 370c. The upper section 370c may include a display 144 and one or more control switches 384a–b. The upper section 370c may contain internal electronics (not shown) similar to the sensor interface module 154, the converter module 158, the display interface module 160, the display 144 and the storage cell 146 shown in FIG. 2. The upper section 370c may include threads 371c for attaching to a faucet. The probe section 368c may include a thermal-electric sensor, such as the temperature sensor 136 also shown in FIG. 2. The digital thermometer 382 may be substituted for the first mechanical thermometer 366, the second mechanical thermometer 366a and/or the chemical thermometer 356b to provide a digital readout in place of an analog readout. The control switches 384a–b may be used to switch the digital thermometer 382 on and off to conserve power when not in use. An example of a conventional digital thermometer may be illustrated by a Pyrex Instant Read Digital Thermometer manufactured by the Robinson Knife Company, Buffalo, N.Y.

Figure 32:
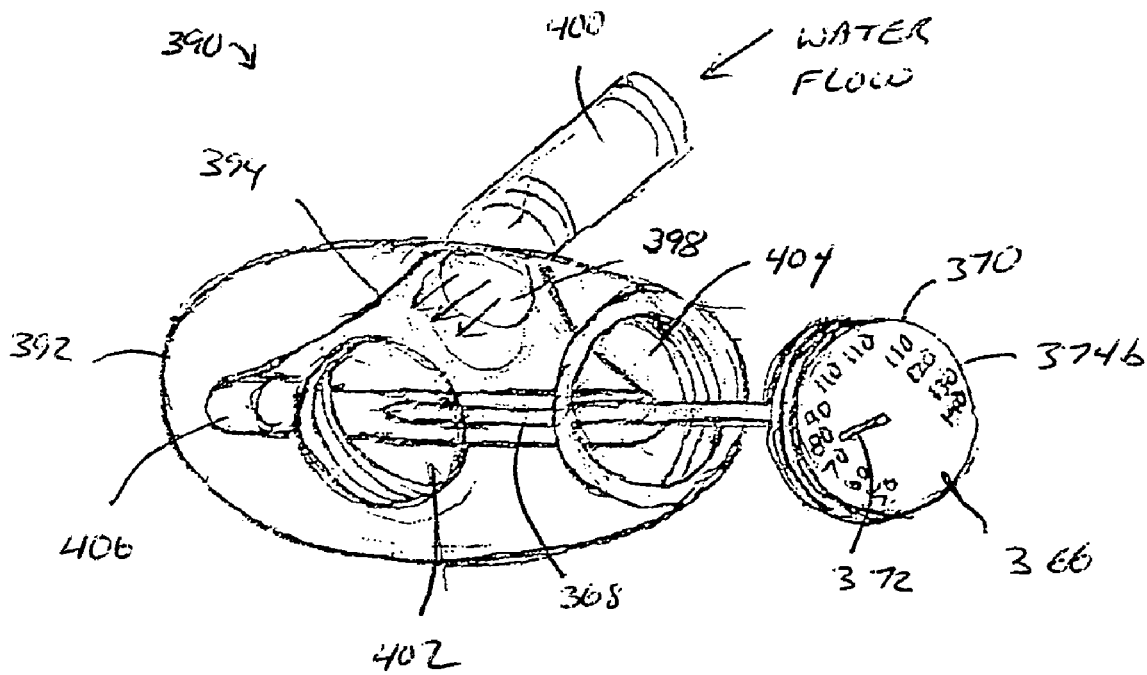
FIG. 32 is a perspective view of a first example implementation of an apparatus.

Referring to FIG. 32, a perspective view of a first example implementation of an apparatus 390 is shown. The apparatus 390 generally comprises a housing 392, a funnel 394 and a thermometer (e.g., the first mechanical thermometer 366). The housing 392 may have a first opening 398 configured to connect to a water pipe 400, such as in a shower stall. A second opening 402 may be provided in the housing 392 opposite the first opening 398. The second opening 402 may be configured to connect to a shower head (not shown). A third opening 404 may be provided in the housing 392 between the first opening 398 and the second opening 402. The third opening 404 may be shaped to receive the thermometer 366.

The funnel 394 may be disposed inside the housing 392 in direct communication with the first opening 398 to receive the water flow from the water pipe 400. The funnel 394 may have a generally elongated opening 406 to generally force the water flow into a plane and toward the second opening 402 to pass over the probe section 368.

The thermometer 366 is generally mounted (e.g., screwed in for removable access) with the probe section 368 positioned in front of the elongated opening 406 while the readout portion 370 is seated in the third opening 404. The probe section 368 may also be generally oriented in the plane defined by the elongated opening 406 to establish good thermal contact with the water.

Water flowing through the funnel 394 may be directed along a length of the probe section 368. The water temperature may be indicated by the dial 372 and the readout indicators 374b. The other thermometers 366a, 356b and/or 382 may be substituted for the first mechanical thermometer 366 in other embodiments.

Figure 33:
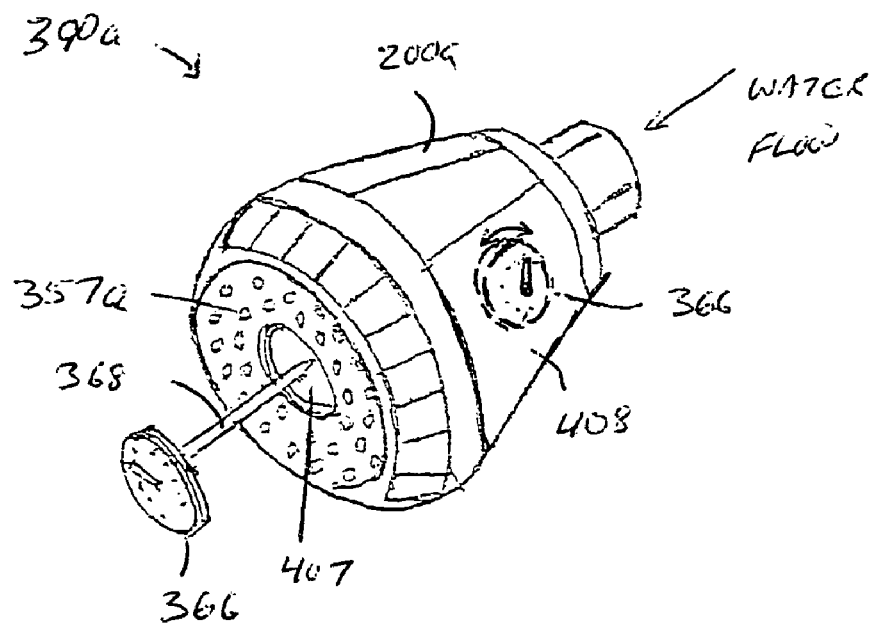
FIG. 33 is a perspective view of a second example implementation of the apparatus.

Referring to FIG. 33, a perspective view of a second example implementation of an apparatus 390a is shown. The apparatus 390a generally comprises a thermometer (e.g., the thermometer 366) mounted through an opening 407 in a face 357a of a shower head 200a. The shower head 200a may be configured to pass the flowing water along the probe section 368 of the thermometer 366 to measure the water temperature. In one embodiment, the thermometer 366 may be mounted in a side wall 408 of the shower head 200a. The thermometer 366 may be rotatably connected to the shower head 200a so that a user may adjust the orientation of the readout indicators 374a–b for proper viewing. The other thermometers 366a, 356b and/or 382 may be substituted for the mechanical thermometer 366.

Figure 34:
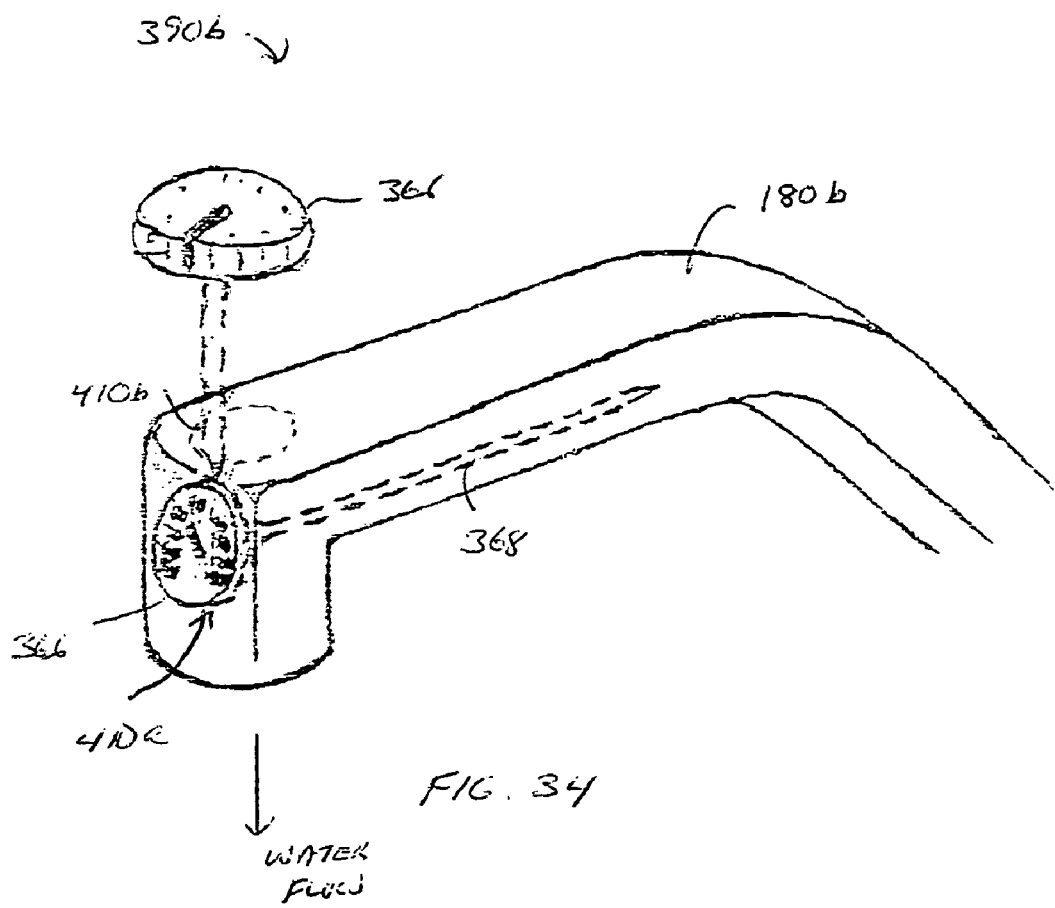
FIG. 34 is a perspective view of a third example implementation of the apparatus.

Referring to FIG. 34, a perspective view of a third example implementation of an apparatus 390b is shown. The apparatus 390b generally comprises a thermometer (e.g., the thermometer 366) mounted through an opening 410a (or 410b) in a faucet 180b. The openings 410a and 410b generally provide the probe section 368 of the thermometer 366 to reside within the water flow and thus sense the water temperature.

Figure 35:
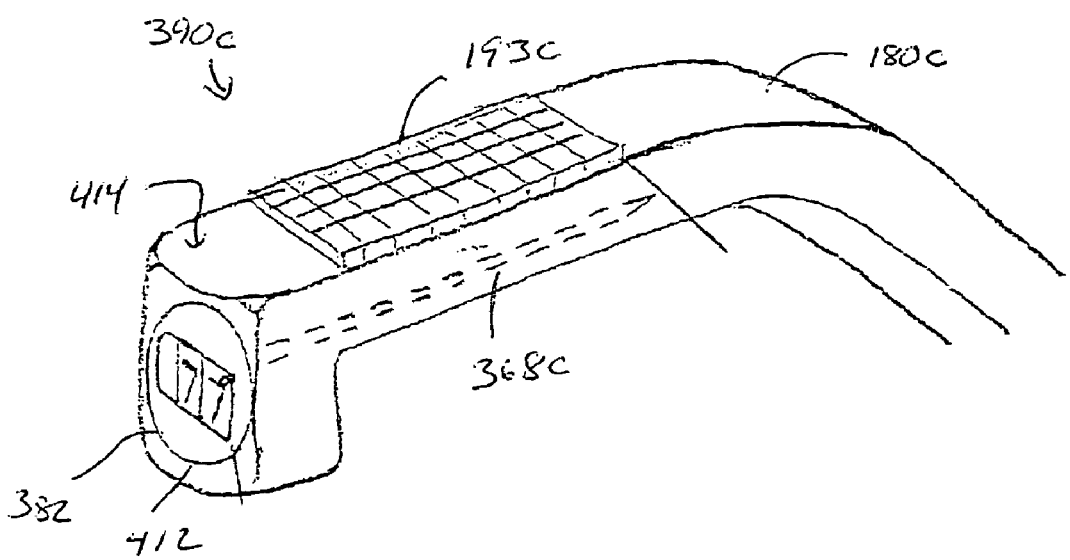
FIG. 35 is a perspective view of a fourth example implementation of the apparatus.

Referring to FIG. 35, a perspective view of a fourth example implementation of an apparatus 390c is shown. The apparatus 390c generally comprises the digital thermometer 382 mounted through an opening 412 in a faucet 180c and an optional solar cell 193c. The solar cell 193c may be mounted on a top surface 414 of the faucet 180c to provide electrical power to the digital thermometer 382. The digital thermometer 382 may be removably attachable to the faucet 180c to permit repair and/or changing a battery (not shown) housed in the digital thermometer 382. In one embodiment, the digital thermometer 382 may be mounted to the faucet through the top surface 414, similar to the mechanical thermometer 366 in opening 410b as shown in FIG. 34.

Figure 36:
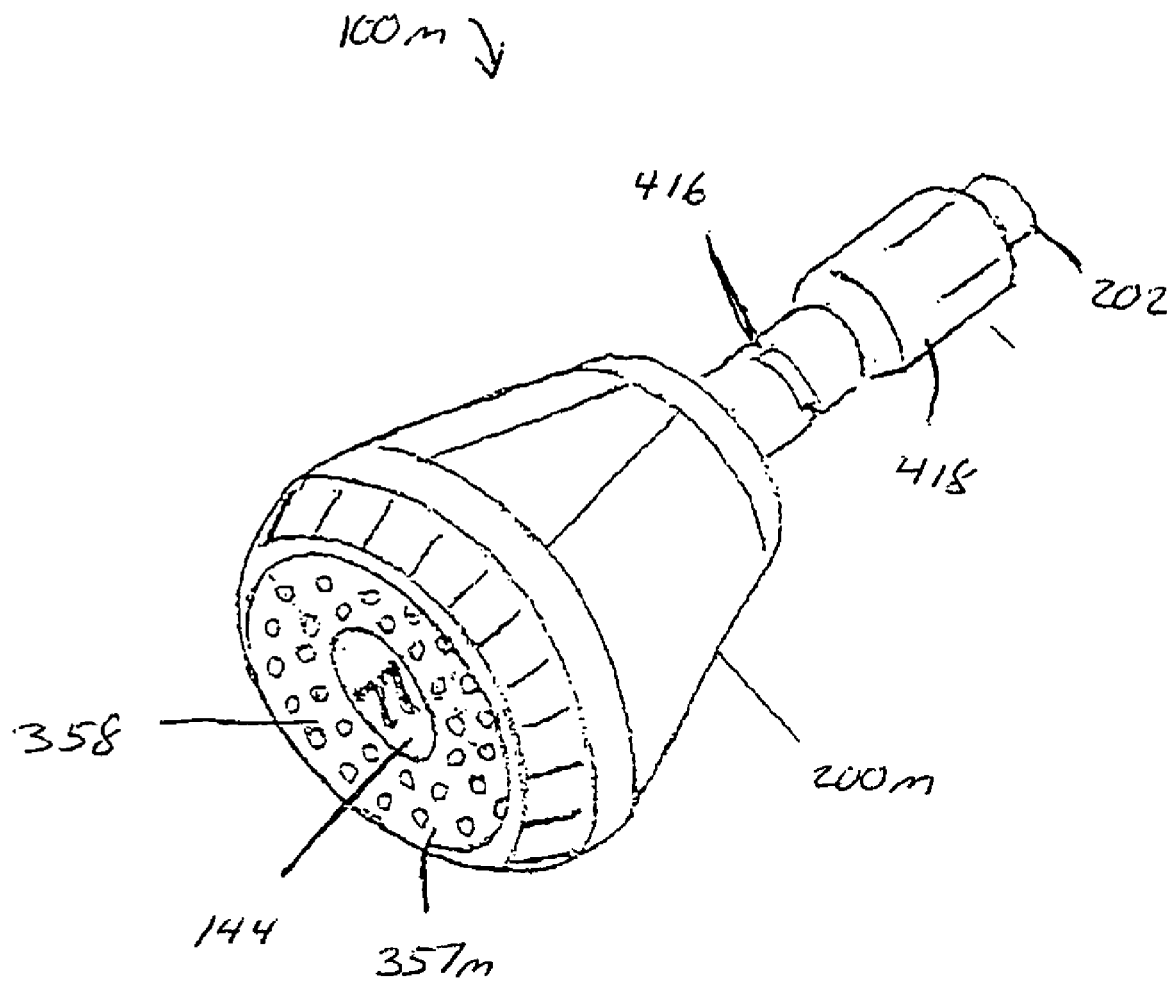
FIG. 36 is a perspective view of a twelfth example implementation of the electrical apparatus.

Referring to FIG. 36, a perspective view of a twelfth example implementation of an apparatus 100m is shown. The apparatus 100m generally comprises a shower head 200m, a digital display 144, the electronic circuit 140 (not shown) and a swivel connection 416. The power microgenerator 130 (not shown) may be disposed in a housing 418 positioned between the shower head 200m and the wall pipe 202. The digital display 144 may be mounted in a center of a face 357m of the shower head 200m. The nozzles 358 may be distributed around the digital display 144. The display 144 may be adapted to swivel relative to the shower head 200m to ease of viewing.

Figure 37:
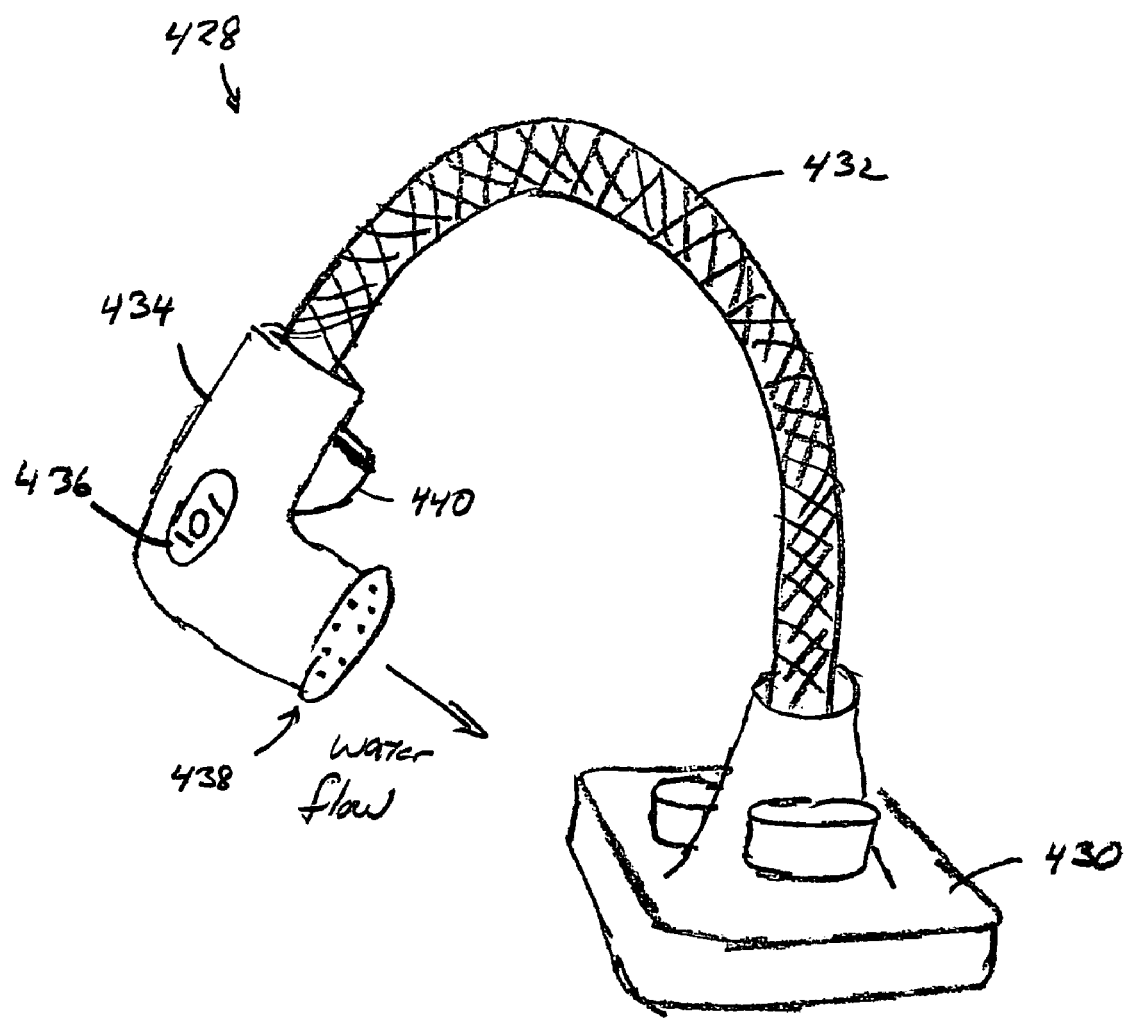
FIG. 37 is a perspective view of an example implementation of another apparatus.

Referring to FIG. 37, a perspective view of an example implementation of an apparatus 428 is shown. The apparatus 428 may be implemented as a faucet assembly. The faucet assembly 428 generally comprises a base 430, a hose 432 and a handle 434. The hose 432 may be formed from a flexible material. The base 430 may be adapted to allow the hose 432 to be retracted into and extended from the base 430. The handle 434 may include a display 436. The display 436 may be implemented as a digital display (as shown), a mechanical display or a chemical display. Any of the various display embodiments described above may be used in the handle 434. The remaining portion of the electronic circuit 140 (not visible) may be disposed within the handle 434, the base 430 or distributed between the handle 434 and the base 430. In one embodiment, the temperature sensor 136 (not visible) may be mounted inside the handle 434 proximate an open end 438 from which the water flows. In another embodiment, the temperature sensor 136 may be mounted in the base 430. In still another embodiment, the display 436 may be mounted to the base 430. A trigger 440 may be provided in the handle 434 to enable one-hand on/off control of the water flow.

Figure 38:
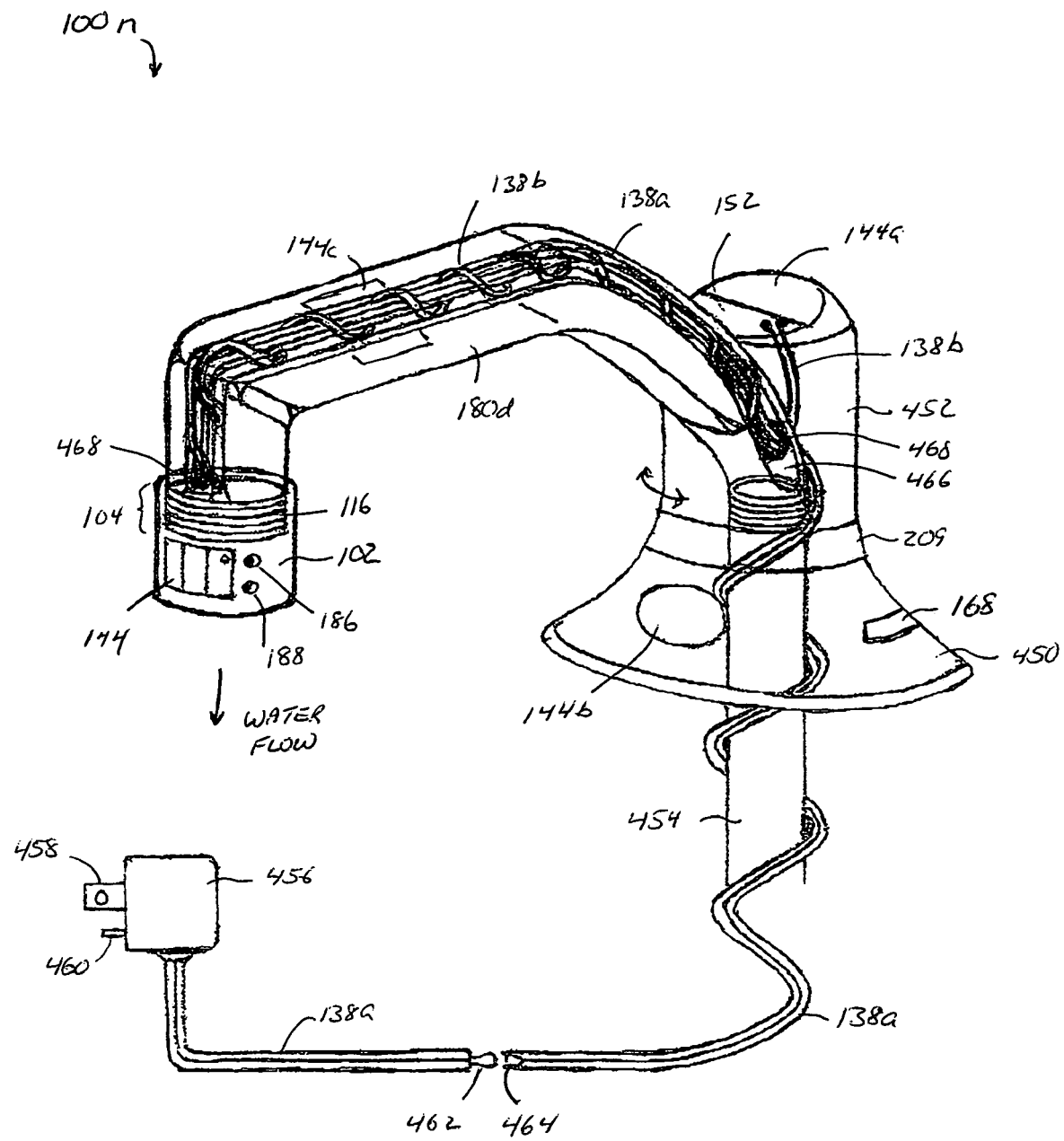
FIG. 38 is a perspective view of a thirteenth example implementation of the electrical apparatus.

Referring to FIG. 38, a perspective view of a thirteenth example implementation of an apparatus 100n is shown. Elements of the apparatus 100n similar to elements of the apparatus 100 may be shown with the same reference numbers. The apparatus 100n may implement a faucet with an integrated temperature sensor combined with a temperature readout display in a single unit connectable to a common wall socket. A mechanical structure of the apparatus 100n may be fabricated from a multitude of materials ranging from a simple casting design to a combination of several independent portions each fabricated separately and then assembled into the final faucet.

Part of the electronic circuit 142 (e.g., all elements except the power interface module 156) may be incorporated into the apparatus 100b. The apparatus 100n generally comprises a base 450, a neck 452, a faucet arm 180d and a housing 102. The neck 452 may be attached to the base 450 with a swivel joint 209. The faucet arm 180d may be attached to the neck 452 at one end and to the housing 102 at the other end. A pipe 454 may provide water thru the base 450 and neck 452 to the faucet arm 180d.

The power source 122 may be implemented as an AC power pack 456. The AC power pack 456 generally comprises a transformer (not shown) and optionally the power interface module 156. A pair of plugs 468 and a ground plug 460 may be integrated into a side of the AC power pack 456 for use with a normal ground fault interruptible (GFI) wall outlet. In one implementation, the power interface module 156 may be implemented to provide a low voltage DC output power from the AC power pack 456. In another implementation, the power interface module 156 may be mounted elsewhere (e.g., the housing 102) such that a low voltage AC out power is provided from the AC power pack 456.

A power harness 138a may carry the electrical power from the AC power pack 456 to the circuit 142 (see FIG. 2). A jack 462 and a socket 464 may be provided in the power harness 138a between the AC power pack 456 and the base 450. The jack 462 and the socket 464 may provide a strain relief protection for the AC power pack 456. In the event of a stress from any source on the power harness 138a and/or the AC power pack 456, the jack 462 and the socket 464 may easily separate to avoid damage.

The power harness 138a may route through the base 450, swivel joint 209, neck 452 and faucet arm 180d in a channel 466 formed in the faucet arm 180d. The channel 466 may provide a water tight insulation around the power harness 138a and an optional a sensor harness 138b. A connector 468 may be provided at the open end of the faucet arm 180d and arranged to connect the power harness 138a and the sensor harness 138b to the circuit 142.

Where the AC power pack 456 generates low voltage DC power, an optional storage cell 146 (see FIG. 2) may be mounted in the base 450, neck 452 or housing 102. The storage cell 146 may allow the AC power pack 456 to be unplugged from a wall outlet. In one embodiment, the storage cell 146 may be implemented as a rechargeable battery accessible through a battery door 168. The rechargeable batter 156 generally allows the apparatus 100n to operate with the AC power pack 456 unplugged, freeing the wall outlet for other uses.

The channel 466 may be located within and integrated with the faucet arm 180d. The channel 466 generally contains wiring connections between the AC power pack 456, the circuit 142 within the housing 102, and any indicators and/or displays mounted in the neck 452 and/or base 450. An opening 468 in the channel 466 may permit the sensor harness 138b access to an interior chamber of the neck 452. The channel 466 may route along and/or around a water channels interior and/or exterior in the faucet arm 180d to keep the wiring isolated from the water flow.

The housing 102 may be implemented similar to as shown in FIG. 1. In one embodiment, the display 144 and up/down switches 186 and 188 may be mounted on the housing 102. The housing 102 may include the top fitting 104 with optional threads 116 to connect to the faucet arm 180d. The switches 186 and 188 may be push-button switches or the like. The housing 102 may include the other optional connections or fittings described above.

The optional sensor harness 138b may be implemented in designs that include the audio indicator 152 and/or mount the display 144 away from the housing 102. The audio indicator 152 may be mounted on a top side of the neck 452. An optional display 144a may be mounted on the top side of the neck 452 adjacent the audio indicator 152. In one embodiment, a display 144b may be mounted in the base 450. In another embodiment, a display 144c may be mounted on a top surface of the faucet arm 180d (see FIG. 4). In general, the display may be located anywhere along the faucet from the housing 102 all the way along the path of the faucet reaching all the way to the base which may swivel. The temperature sensor may be located anywhere in the faucet attached or separate to the temperature display by interconnecting wiring or other means in the water proof canal that is used throughout.

The various components of the electronic circuit 140 illustrated above may be packaged together for simple attachment to a water source or mounted apart from each other integral to a pipe, faucet, shower head, hose and/or base. For example, the display 144 and the power source 122 may be manufactured as a single unit, such as in the apparatus 100 (FIG. 1) or as multiple units, such as in the apparatus 100j (FIG. 15). In another example, the storage cell (e.g., battery) may be mounted in a first location suitable for easy access while the display 144 and visual indicators 150 are mounted in a second location (remote from the first location) suitable for good viewing by the user. The various components may also be mounted in an orientation (e.g., horizontally or vertically) to meet the criteria of a particular design application. Housings that are to be coupled to pipes, shower heads, faucets or the like, may include additional attachment support. For example, one or more hose clamps may be provided to secure the housing to a water fixture.

The present invention may provide an ultimate expression of independent reaction from its own power. The invention may be manufactured as individual units for home and/or businesses that are in place. The design features of the present invention, all related by the fact that all are able to be completely independent as noted above, each individual and separate unit may be able to be adjusted to fit and function in place where the plumbing is already in existence. Designs may be manufactured by companies that may introduce all of the design ingredients of the present invention in a single housing form. All designs may be interactive with and may include functional abilities on their own. The embodiments right along side the faucet fixture itself whatever applies to one design aspect applies to all in this design feature layout of the invention is the feature of being integrated into a specific design or an individual design.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a housing having a bore adaptable to receive a flow of water, wherein said housing comprises a bath mat;
   a power source for generating electricity coupled to said housing;
   a temperature sensor coupled to said housing and in thermal contact with said water flowing through said bore;
   a visual display coupled to said housing and configured to display a temperature of said water; and
   a circuit powered by said electricity and configured to control said display in response to reading said temperature sensor.

2. The apparatus according to claim 1, wherein said power source comprises at least one generator disposed in said bore and driven by said water.

3. The apparatus according to claim 2, further comprising a battery configured to supplement said power source.

4. The apparatus according to claim 1, wherein said circuit is configured to generate an alarm signal in response to said temperature exceeding a threshold.

5. The apparatus according to claim 4, further comprising a visual indicator controlled by said circuit in response to said alarm signal.

6. The apparatus according to claim 4, further comprising an audible indicator controlled by said circuit in response to said alarm signal.

7. The apparatus according to claim 4, further comprising an alarm setting sensor configured to generate said threshold.

8. The apparatus according to claim 1, wherein said power source comprises a solar cell.

9. An apparatus comprising:
   a housing having a bore adaptable to receive a flow of water, wherein said housing comprises (i) an annular portion having a diameter larger than a drain and (ii) an inner portion axially disposed within and connected to said annular portion, and wherein a space between said inner portion and said annular portion defines said bore;
   a power source for generating electricity coupled to said housing;
   a temperature sensor coupled to said housing and in thermal contact with said water flowing through said bore;
   a visual display coupled to said housing and configured to display a temperature of said water; and
   a circuit powered by said electricity and configured to control said display in response to reading said temperature sensor.

10. An apparatus comprising:
    a housing comprising (i) an opening configured to receive a flow of water, (ii) a cavity in thermal communication with said flow of water and (iii) a window configured to allow viewing of said cavity from external to said housing, wherein said housing comprises a bath mat; and
    a material disposed in said cavity having a temperature sensitive property visible through said window to indicate a temperature of said flow of water.

11. The apparatus according to claim 10, wherein said temperature sensitive property comprises one of a thermally sensitive color and a thermally sensitive volume.

12. The apparatus according to claim 10, wherein said housing further comprises a thermally conductive portion protruding into said opening to contact said water while flowing.

13. The apparatus according to claim 10, wherein said opening is approximately a size of a drain.

14. The apparatus according to claim 10, wherein said housing further comprises a conical shape disposed within said opening.

15. An apparatus comprising:
    a housing comprising (i) an opening configured to receive a flow of water, (ii) a cavity in thermal communication with said water and (iii) a window configured to allow viewing of said cavity from external to said housing;
    a material disposed in said cavity having a temperature sensitive property visible through said window to indicate a temperature of said water; and
    a weight scale disposed in said housing to measure a user weight.

16. The apparatus according to claim 9, wherein said power source comprises a solar cell.

17. The apparatus according to claim 9, wherein said circuit is configured to generate an alarm signal in response to said temperature exceeding a threshold.

18. The apparatus according to claim 17, further comprising a visual indicator controlled by said circuit in response to said alarm signal.

19. The apparatus according to claim 17, further comprising an audible indicator controlled by said circuit in response to said alarm signal.

20. The apparatus according to claim 15, wherein said temperature sensitive property comprises one of a thermally sensitive color and a thermally sensitive volume.

21. The apparatus according to claim 15, wherein said housing further comprises a thermally conductive portion protruding into said opening to contact said water while flowing.

22. The apparatus according to claim 15, wherein said opening is approximately a size of a drain.

* * * * *